US012617174B2

(12) United States Patent
Kim et al.

(10) Patent No.: US 12,617,174 B2
(45) Date of Patent: May 5, 2026

(54) DISPLAY PANEL AND DISPLAY APPARATUS

(71) Applicant: SAMSUNG DISPLAY CO., LTD.,
Yongin-si (KR)

(72) Inventors: Sangwoo Kim, Yongin-si (KR); Hosik Shin, Yongin-si (KR); Hyejin Joo, Yongin-si (KR)

(73) Assignee: SAMSUNG DISPLAY CO., LTD.,
Gyeonggi-Do (KR)

( * ) Notice: Subject to any disclaimer, the term of this patent is extended or adjusted under 35 U.S.C. 154(b) by 949 days.

(21) Appl. No.: 17/747,304

(22) Filed: May 18, 2022

(65) Prior Publication Data

US 2023/0044811 A1 Feb. 9, 2023

(30) Foreign Application Priority Data

Aug. 6, 2021 (KR) ........................ 10-2021-0104197

(51) Int. Cl.
*B32B 3/02* (2006.01)
(52) U.S. Cl.
CPC ...................................... *B32B 3/02* (2013.01)
(58) Field of Classification Search
CPC ........................................................ B32B 3/02
USPC ......................................................... 428/192
See application file for complete search history.

(56) References Cited

U.S. PATENT DOCUMENTS 9,972,645 B2 5/2018 Kim
10,939,547 B2 3/2021 Lee et al.

| | | |
|---|---|---|
| 11,094,895 B2 | 8/2021 | Dai |
| 11,528,812 B2 | 12/2022 | Ahn et al. |
| 11,895,862 B2 | 2/2024 | Park et al. |
| 2017/0194354 A1* | 7/2017 | Kim ...................... H10D 86/441 |
| 2018/0184531 A1* | 6/2018 | Seo .......................... H05K 5/03 |
| 2020/0176696 A1 | 6/2020 | Dai |
| 2021/0376006 A1 | 12/2021 | Won et al. |
| 2022/0077242 A1 | 3/2022 | Yoon et al. |
| 2023/0044811 A1* | 2/2023 | Kim ..................... H10K 59/121 |

FOREIGN PATENT DOCUMENTS

| | | |
|---|---|---|
| CN | 108766977 A | 11/2018 |
| CN | 111799310 A | 10/2020 |
| CN | 112133733 A | 12/2020 |
| KR | 20150061915 A | 6/2015 |

(Continued)

*Primary Examiner* — Betelhem Shewareged

(74) *Attorney, Agent, or Firm* — CANTOR COLBURN LLP

(57) ABSTRACT

A display panel includes a display area which includes a center area and a corner area arranged at a corner of the display panel, where a plurality of pixels is arranged in the corner area, and a non-display area arranged outside the display area. The corner area includes a central corner area including a plurality of extension areas each extending in a direction away from the center area and at least partially separated from each other, a first adjacent corner area adjacent to the central corner area, and a second adjacent corner area spaced apart from the first adjacent corner area with the central corner area therebetween, and the non-display area includes a bypass area extending from the first adjacent corner area to the second adjacent corner area to at least partially surround the central corner area.

10 Claims, 13 Drawing Sheets

(56) References Cited

FOREIGN PATENT DOCUMENTS

| | | | |
|---|---|---|---|
| KR | 20170081076 | A | 7/2017 |
| KR | 1020190102123 | A | 9/2019 |
| KR | 20200063379 | A | 6/2020 |
| KR | 1020210149283 | A | 12/2021 |
| KR | 1020220034278 | A | 3/2022 |
| KR | 20220062182 | A | 5/2022 |
| WO | 2019223776 | A1 | 11/2019 |

* cited by examiner

ACA1-1 ⎫
ACA1-2 ⎭ ACA1

ACA2-1 ⎫
ACA2-2 ⎭ ACA2

DISPLAY PANEL AND DISPLAY APPARATUS

This application claims priority to Korean Patent Application No. 10-2021-0104197, filed on Aug. 6, 2021, and all the benefits accruing therefrom under 35 U.S.C. § 119, the content of which in its entirety is herein incorporated by reference.

BACKGROUND

1. Field

One or more embodiments relate to a display panel and a display apparatus.

2. Description of the Related Art

Mobile electronic devices, such as tablet personal computers ("PC"s), in addition to small electronic devices, such as mobile phones, have become widely used in various fields.

Such mobile electronic devices include displays to provide a user with various functions, for example, visual information such as an image or a video. Recently, with the miniaturization of various components for driving electronic devices, the importance of display apparatuses for electronic devices has continually increased, and a structure to bend a flat display apparatus to have a predetermined angle has been developed.

SUMMARY

A display apparatus may include a display panel including a display area displaying an image and a non-display area arranged outside the display area. The display area may include a corner area that is bent at a corner, and relatively great stress may be generated in this corner area.

One or more embodiments provide a display panel and a display apparatus having the improved reliability with the reduction of a stress generated in a corner area.

According to one or more embodiments, a display panel includes a display area which includes a center area and a corner area arranged at a corner of the display panel, where a plurality of pixels is arranged in the corner area, and a non-display area arranged outside the display area. In such embodiments, the corner area includes a central corner area including a plurality of extension areas each extending in a direction away from the center area and at least partially separated from each other, a first adjacent corner area adjacent to the central corner area, and a second adjacent corner area spaced apart from the first adjacent corner area with the central corner area therebetween, and the non-display area includes a bypass area extending from the first adjacent corner area to the second adjacent corner area to at least partially surround the central corner area.

In an embodiment, the bypass area may extend from each of the plurality of extension areas, and the plurality of extension areas and the bypass area may be integrally formed with each other as a single unitary unit.

In an embodiment, a first opening area may be defined by being surrounded by the first adjacent corner area, a corresponding one of the plurality of extension areas adjacent to the first adjacent corner area, and the bypass area, where the first opening area may have a first edge having a shape of a closed curve, and a second opening area may be defined by being surrounded by the second adjacent corner area, a corresponding one of the plurality of extension areas adjacent to the second adjacent corner area, and the bypass area, where the second opening area may have a second edge having a shape of a closed curve.

In an embodiment, the plurality of extension areas may include a first extension area and a second extension area adjacent to each other, a third opening area may be defined by being surrounded by the first extension area, the second extension area, and the bypass area, and the third opening area may have a third edge having a shape of a closed curve.

In an embodiment, the display panel may further include a plurality of driving circuits including a first driving circuit arranged in the first extension area and a second driving circuit arranged in the second extension area, where the plurality of pixels may include a first pixel arranged in the first extension area and overlapping the first driving circuit and a second pixel arranged in the second extension area and overlapping the second driving circuit, and the third opening area may extend between the first driving circuit and the second driving circuit.

In an embodiment, an opening area may be defined by being surrounded by the first adjacent corner area, the plurality of extension areas, the second adjacent corner area, and the bypass area, and the opening area may have an edge having a shape of a closed curve.

In an embodiment, at least a portion of the bypass area may have a round shape.

In an embodiment, the display panel may further include an inorganic insulating layer arranged in the bypass area, a bypass line arranged on the inorganic insulating layer, and an organic insulating layer arranged on the bypass line.

In an embodiment, the display panel may further include a lower organic insulating layer arranged in the bypass area, a bypass line arranged on the lower organic insulating layer, and an organic insulating layer arranged on the bypass line.

In an embodiment, the display area may further include a first adjacent area extending from the center area in a first direction and a second adjacent area extending from the center area in a second direction crossing the first direction, and the corner area may at least partially surround the first adjacent area, the center area, and the second adjacent area.

According to one or more embodiments, a display apparatus includes a display panel including a display area which includes a center area and a corner area arranged at a corner of the display panel, where the corner area is bent and a plurality of pixels is arranged in the corner area, and a non-display area arranged outside the display area, and a cover window including a transmission area overlapping the display area and a light blocking area overlapping the non-display area. In such embodiments, the corner area includes a central corner area including a plurality of extension areas each extending in a direction away from the center area and at least partially separated from each other, a first adjacent corner area adjacent to the central corner area, and a second adjacent corner area spaced apart from the first adjacent corner area with the central corner area therebetween, and the non-display area includes a bypass area extending from the first adjacent corner area to the second adjacent corner area to at least partially surround the central corner area.

In an embodiment, the bypass area may extend from each of the plurality of extension areas, and the plurality of extension areas and the bypass area may be integrally formed with each other as a single unitary unit.

In an embodiment, a first opening area may be defined by being surrounded by the first adjacent corner area, any one of the plurality of extension areas adjacent to the first adjacent corner area, and the bypass area, where the first opening area may have a first edge having a shape of a closed curve, and a second opening area may be defined by being surrounded by the second adjacent corner area, any one of the plurality of extension areas adjacent to the second adjacent corner area, and the bypass area, where the second opening area may have a second edge having a shape of a closed curve.

In an embodiment, the plurality of extension areas may include a first extension area and a second extension area adjacent to each other, a third opening area may be defined by being surrounded by the first extension area, the second extension area, and the bypass area, and the third opening area may have a third edge having a shape of a closed curve.

In an embodiment, the display panel may further include a plurality of driving circuits including a first driving circuit arranged in the first extension area and a second driving circuit arranged in the second extension area. In such an embodiment, the plurality of pixels may include a first pixel arranged in the first extension area and overlapping the first driving circuit and a second pixel arranged in the second extension area and overlapping the second driving circuit, and the third opening area may extend between the first driving circuit and the second driving circuit.

In an embodiment, an opening area may be defined by being surrounded by the first adjacent corner area, the plurality of extension areas, the second adjacent corner area, and the bypass area, and the opening area may have an edge having a shape of a closed curve.

In an embodiment, at least a portion of the bypass area may have a round shape.

In an embodiment, the display panel may further include an inorganic insulating layer arranged in the bypass area, a bypass line arranged on the inorganic insulating layer, and an organic insulating layer arranged on the bypass line.

In an embodiment, the display panel may further include a lower organic insulating layer arranged in the bypass area, a bypass line arranged on the lower organic insulating layer, and an organic insulating layer arranged on the bypass line.

In an embodiment, the display area may further include a first adjacent area adjacent to the center area in a first direction and being bent and a second adjacent area adjacent to the center area in a second direction crossing the first direction and being bent, and the corner area may at least partially surround the first adjacent area, the center area, and the second adjacent area.

BRIEF DESCRIPTION OF THE DRAWINGS

The above and other features of certain embodiments of the disclosure will be more apparent from the following description taken in conjunction with the accompanying drawings, in which:

FIG. 6 is a schematic cross-sectional view of the display panel of FIG. 5A, taken along line E-E';

FIGS. 7A and 7B are cross-sectional views of the display panel of FIG. 5A, taken along line F-F', according to various embodiments;

DETAILED DESCRIPTION

Figure 1:
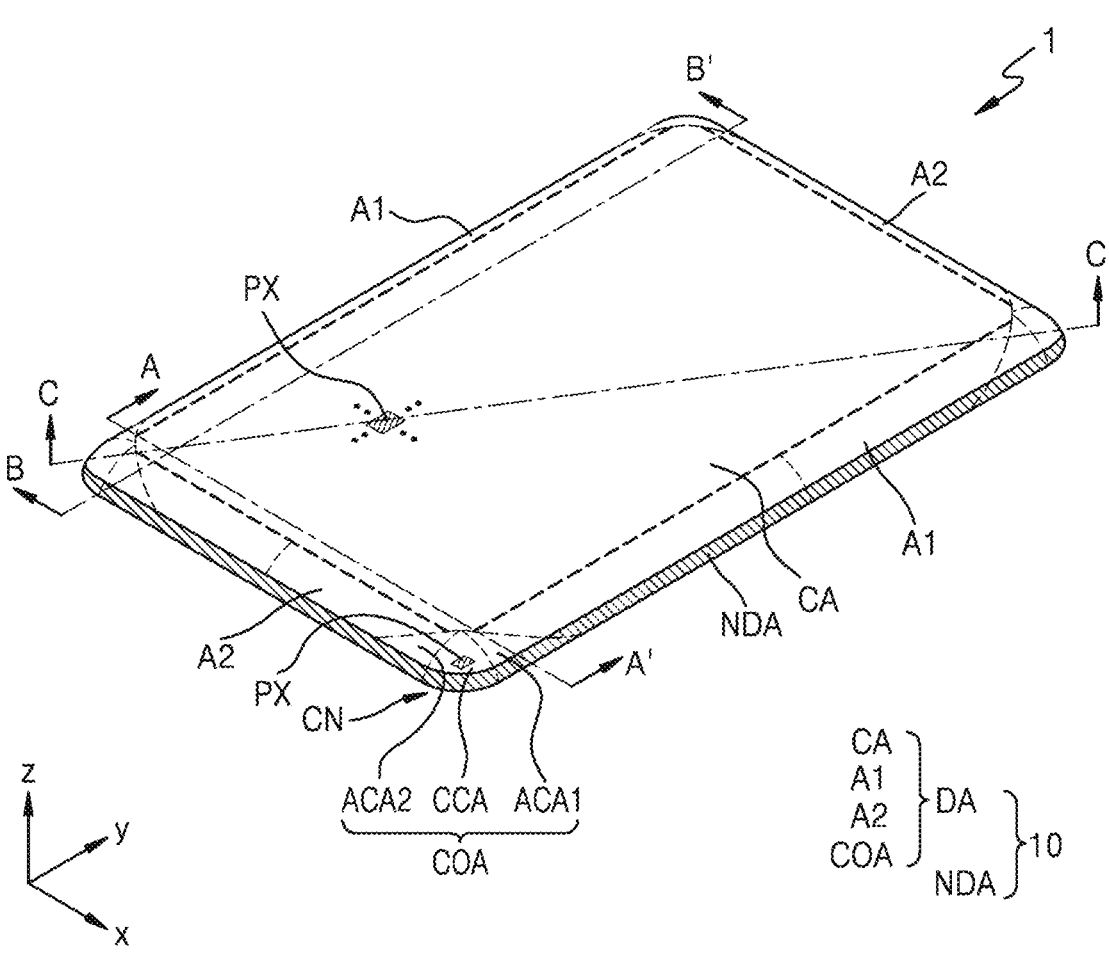
FIG. 1 is a schematic perspective view of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

While the disclosure is capable of various modifications and alternative forms, embodiments thereof are shown by way of example in the drawings and will herein be described in detail. Effects and characteristics of the disclosure, and realizing methods thereof will become apparent by referring to the drawings and embodiments described in detail below. However, the disclosure is not limited to the embodiments disclosed hereinafter and may be realized in various forms.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Sizes of elements in the drawings may be exaggerated for convenience of explanation. For example, sizes and thicknesses of the elements in the drawings are randomly indicated for convenience of explanation, and thus, the disclosure is not necessarily limited to the illustrations of the drawings.

When a certain embodiment may be implemented differently, a specific process order may be performed differently from the described order. For example, two consecutively described processes may be performed substantially at the same time or performed in an order opposite to the described order.

In the embodiments hereinafter, it will be understood that when an element, an area, or a layer is referred to as being connected to another element, area, or layer, it can be directly or indirectly connected to the other element, area, or layer. For example, it will be understood in this specification that when an element, an area, or a layer is referred to as being in contact with or being electrically connected to another element, area, or layer, it can be directly or indirectly in contact with or electrically connected to the other element, area, or layer.

A display apparatus may be an apparatus displaying a video or a static image and may be used as a display screen of various products including not only portable electronic devices, such as a mobile phone, a smart phone, a tablet personal computer ("PC"), a mobile communication terminal, an electronic notebook, an electronic book, a portable multimedia player ("PMP"), a navigation device, and a ultra mode PC ("UMPC"), but also other devices, such as a television, a notebook computer, a monitor, a broadcasting panel, and an Internet of things ("IOT") device. Also, the display apparatus according to an embodiment may be used in wearable devices, such as a smart watch, a watch phone, a glasses-type display, and a head-mounted display ("HMD"). Also, the display apparatus according to an embodiment may be used as: a gauge of a vehicle, a center fascia of a vehicle, or a center information display on a dashboard; a room mirror display substituting a side-view mirror of a vehicle; or a display disposed on a rear surface of a front seat, as an entertainment device for a backseat of a vehicle.

Hereinafter, embodiments of the invention will be described in detail with reference to the accompanying drawings.

Figure 2A:
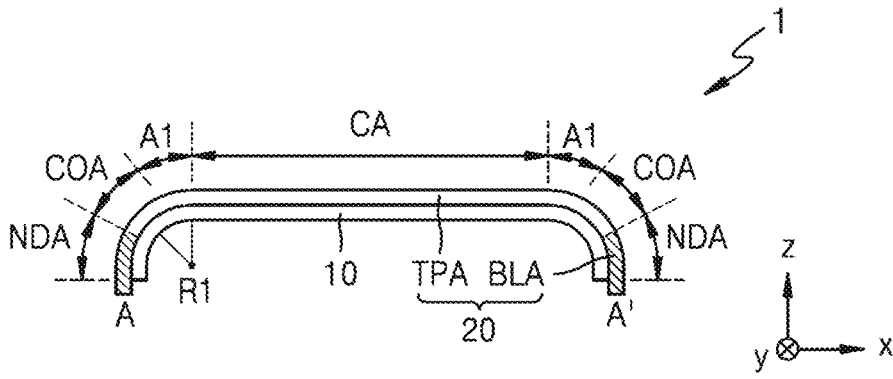
FIG. 2A is a cross-sectional view of the display apparatus of FIG. 1, taken along line A-A'.
Figure 2B:
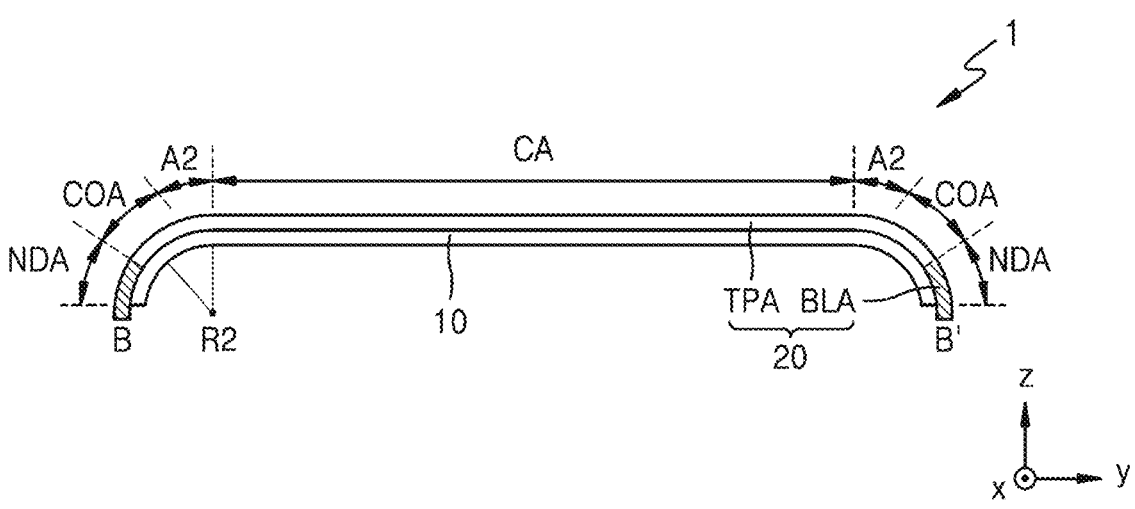
FIG. 2B is a cross-sectional view of the display apparatus of FIG. 1, taken along line B-B'.
Figure 2C:
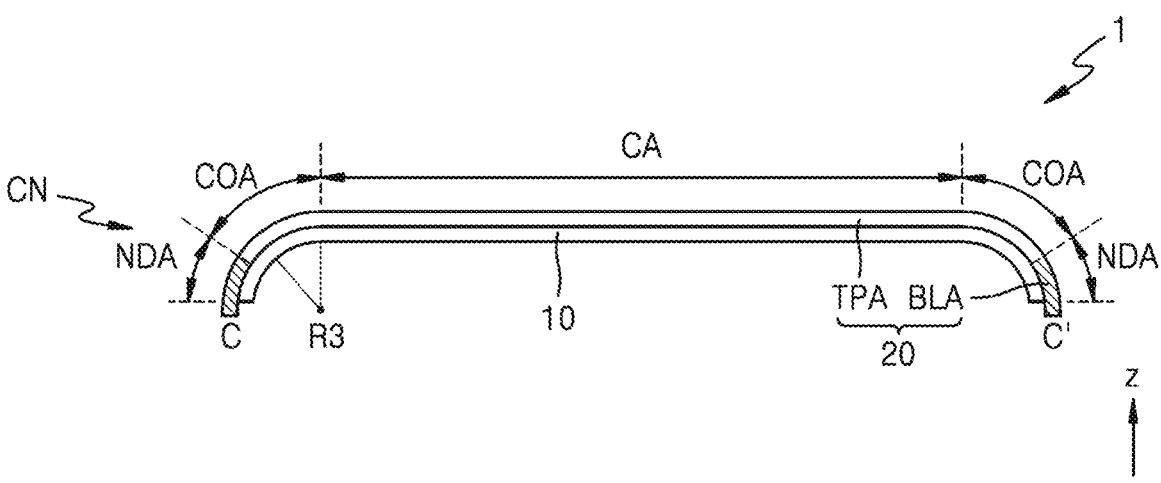
FIG. 2C is a cross-sectional view of the display apparatus of FIG. 1, taken along line C-C'.

FIG. 1 is a schematic perspective view of a display apparatus 1 according to an embodiment. FIG. 2A is a cross-sectional view of the display apparatus 1 of FIG. 1, taken along line A-A'. FIG. 2B is a cross-sectional view of the display apparatus 1 of FIG. 1, taken along line B-B'. FIG. 2C is a cross-sectional view of the display apparatus 1 of FIG. 1, taken along line C-C'.

Referring to FIGS. 1 and 2A through 2C, an embodiment of the display apparatus 1 may display an image. The display apparatus 1 may have an edge in a first direction and an edge in a second direction. Here, the first direction and the second direction may cross each other. In an embodiment, for example, the first direction and the second direction may make an acute angle with each other. In an alternative embodiment, for example, the first direction and the second direction may make an obtuse angle with each other or cross each other at right angles. Hereinafter, embodiments in which the first direction and the second direction cross each other at right angles will be mainly described in detail. In such embodiments, for example, the first direction may be an x direction or a -x direction, and the second direction may be a y direction or a -y direction. In such embodiments, a third direction may be a z direction or a thickness direction of the display apparatus 1.

According to an embodiment, a corner CN at which an edge of the display apparatus 1 extending in the first direction (for example, the x direction or the -x direction), meets an edge of the display apparatus 1 extending in the second direction (for example, the y direction or the -y direction) may have a predetermined curvature.

In an embodiment, the display apparatus 1 may include a display panel 10 and a cover window 20. The display panel 10 may display an image. The display panel 10 may include a display area DA and a non-display area NDA. A pixel PX may be arranged (or defined) in the display area DA and may not be arranged in the non-display area NDA. In the display area, the pixel PX may be arranged, and thus, the display area DA may be an area for displaying an image. According to an embodiment, a plurality of pixels PX may be arranged in the display area DA. In the non-display area NDA, the pixel PX may not be arranged, and thus, the non-display area NDA may be an area in which no image is displayed. In the non-display area NDA, a line and/or a driving circuit configured to transmit a power voltage and/or a signal to the pixel PX may be arranged. The display area DA may include a center area CA, a first adjacent area A1, a second adjacent area A2, and a corner area COA. According to an embodiment, each of the center area CA, the first adjacent area A1, the second adjacent area A2, and the corner area COA may provide a separate image. According to an alternative embodiment, each of the center area CA, the first adjacent area A1, the second adjacent area A2, and the corner area COA may provide a portion of an image.

The center area CA may be flat. According to an embodiment, the display apparatus 1 may provide most of the image on the center area CA.

The first adjacent area A1 may be bent while being adjacent to the center area CA in the first direction (for example, the x direction or the -x direction). The first adjacent area A1 may be defined as an area on a section (for example, an x-z section) in the first direction (for example, the x direction or the -x direction), the area being bent from the center area CA. The first adjacent area A1 may extend in the second direction (for example, the y direction or the -y direction). In such an embodiment, the first adjacent area A1 may not bend on a section (for example, a y-z section) in the second direction (for example, the y direction or the -y direction). FIG. 2A illustrates an embodiment where the first adjacent area A1 extending from the center area CA in the x direction to be bent and the first adjacent area A1 extending from the center area CA in the -x direction to be bent may have a same curvature as each other. However, according to an alternative embodiment, the first adjacent area A1 extending from the center area CA in the x direction to be bent and the first adjacent area A1 extending from the center area CA in the −x direction to be bent may have different curvatures from each other.

The second adjacent area A2 may be bent while being adjacent to the center area CA in the second direction (for example, the y direction or the −y direction). The second adjacent area A2 may be defined as an area on the section (for example, the y-z section) in the second direction (for example, the y direction or the −y direction), the area being bent from the center area CA. The second adjacent area A2 may extend in the first direction (for example, the x direction or the −x direction). The second adjacent area A2 may not bend on the section (for example, the x-z section) in the first direction (for example, the x direction or the −x direction). FIG. 2B illustrates an embodiment where the second adjacent area A2 extending from the center area CA in the y direction to be bent and the second adjacent area A2 extending from the center area CA in the −y direction to be bent may have a same curvature as each other. However, according to an alternative embodiment, the second adjacent area A2 extending from the center area CA in the y direction to be bent and the second adjacent area A2 extending from the center area CA in the −y direction to be bent may have different curvatures from each other.

The corner area COA may be an area arranged at the corner CN. According to an embodiment, the corner area COA may at least partially surround the center area CA, the first adjacent area A1, and the second adjacent area A2. In an embodiment where the first adjacent area A1 extends in the first direction (for example, the x direction or the −x direction) and bends, and the second adjacent area A2 extends in the second direction (for example, the y direction or the −y direction) and bends, at least a portion of the corner area COA may extend in the first direction (for example, the x direction or the −x direction) and may bend and extend in the second direction (for example, the y direction or the −y direction) and may bend. In such an embodiment, at least a portion of the corner area COA may be a curved surface area in which a curved surface area having a plurality of curvatures in a plurality of directions. According to an embodiment, the corner area COA may be provided in in plural. The corner area COA may include a central corner area CCA, a first adjacent corner area ACA1, and a second adjacent corner area ACA2.

The central corner area CCA may extend in the first direction (for example, the x direction or the −x direction) to be bent and may extend in the second direction (for example, the y direction or the −y direction) to be bent. The central corner area CCA may be bent on the section (for example, the x-z section) in the first direction (for example, the x direction or the −x direction). The central corner area CCA may be bent on the section (for example, the y-z section) in the second direction (for example, the y direction or the −y direction). The central corner area CCA may be a curved surface area having a plurality of curvatures in a plurality of directions.

The first adjacent corner area ACA1 may be adjacent to the central corner area CCA. According to an embodiment, the first adjacent corner area ACA1 may be arranged between the central corner area CCA and the first adjacent area A1. According to an embodiment, at least a portion of the first adjacent area A1 may be arranged between the center area CA and the first adjacent corner area ACA1 in the first direction (for example, the x direction or the −x direction). The first adjacent corner area ACA1 may extend in the first direction (for example, the x direction or the −x direction) and may bend. The first adjacent corner area ACA1 may be defined as the corner area COA that is bent on the section (for example, the x-z section) in the first direction (for example, the x direction or the −x direction). According to an embodiment, at least a portion of the first adjacent area A1 and the first adjacent corner area ACA1 may be arranged in the first direction (for example, the x direction or the −x direction) to be bent. According to an embodiment, the first adjacent corner area ACA1 may be the corner area COA that is substantially not bent on the section (for example, the y-z section) in the second direction (for example, the y direction or the −y direction).

The second adjacent corner area ACA2 may be adjacent to the central corner area CCA. In an embodiment, the second adjacent corner area ACA2 may be spaced apart from the first adjacent corner area ACA1 with the central corner area CCA therebetween. In such an embodiment, the central corner area CCA may be arranged between the first adjacent corner area ACA1 and the second adjacent corner area ACA2. According to an embodiment, the second adjacent corner area ACA2 may be arranged between the central corner area CCA and the second adjacent area A2. According to an embodiment, at least a portion of the second adjacent area A2 may be arranged between the center area CA and the second adjacent corner area ACA2 in the second direction (for example, the y direction or the −y direction). The second adjacent corner area ACA2 may extend in the second direction (for example, the y direction or the −y direction) and may bend. The second adjacent corner area ACA2 may be defined as the corner area COA that is bent on the section (for example, the y-z section) in the second direction (for example, the y direction or the −y direction). According to an embodiment, at least a portion of the second adjacent area A2 and the second adjacent corner area ACA2 may be arranged in the second direction (for example, the y direction or the −y direction) to be bent. According to an embodiment, the second adjacent corner area ACA2 may be the corner area COA that is substantially not bent on the section (for example, the x-z section) in the first direction (for example, the x direction or the −x direction).

Referring to FIG. 2A, the first adjacent area A1, a portion of the corner area COA, and the non-display area NDA may bend by having a first radius of curvature R1. According to an embodiment, the portion of the corner area COA may be the first adjacent corner area ACA1. Referring to FIG. 2B, the second adjacent area A2, another portion of the corner area COA, and the non-display area NDA may bend by having a second radius of curvature R2. According to an embodiment, the other portion of the corner area COA may be the second adjacent corner area ACA2. Referring to FIG. 2C, yet another portion of the corner area COA and the non-display area NDA may bend by having a third radius of curvature R3. According to an embodiment, the other portion of the corner area COA may be the central corner area CCA.

The pixel PX may be provided in plural, and the plurality of pixels PX may emit light to display an image. According to an embodiment, each of the plurality of pixels PX may include a red sub-pixel, a green sub-pixel, and a blue sub-pixel. Alternatively, each of the plurality of pixels PX may include a red sub-pixel, a green sub-pixel, a blue sub-pixel, and a white sub-pixel.

The cover window 20 may be arranged on the display panel 10. The cover window 20 may protect the display panel 10. According to an embodiment, the cover window 20 may include a flexible window. The cover window 20 may protect the display panel 10 by being easily bent according to an external force without cracks, etc. being generated. According to an embodiment, the cover window 20 may include ultra-thin glass or colorless polyimide. According to an embodiment, the cover window 20 may have a structure in which a flexible polymer layer is arranged on a surface of a glass substrate or may have a structure including only a polymer layer. According to an embodiment, the cover window 20 may include a transmission area TPA and a light blocking area BLA.

The transmission area TPA may be transparent. The transmission area TPA may overlap the display area DA. According to an embodiment, the transmission area TPA may overlap the center area CA, the first adjacent area A1, the second adjacent area A2, and the corner area COA. Thus, light emitted from the display panel 10 may be transmitted through the transmission area TPA, and the display apparatus 1 may display an image through the transmission area TPA.

The light blocking area BLA may at least partially surround the transmission area TPA. According to an embodiment, the light blocking area BLA may define a size of the transmission area TPA. The light blocking area BLA may overlap the non-display area NDA. The light blocking area BLA may be non-transparent. Thus, a line, a driving circuit, etc. of the display panel 10, arranged in the non-display area NDA, may not be recognized from the outside. According to an embodiment, the light blocking area BLA may include a bezel area.

Although not shown, a transparent adhesion member, such as an optically clear adhesive film, may be arranged between the display panel 10 and the cover window 20.

In an embodiment of the display apparatus 1, the plurality of pixels PX may be arranged not only in the center area CA, but also in the first adjacent area A1, the second adjacent area A2, and the corner area COA, for displaying an image. Thus, a ratio of an area for displaying an image with respect to the display apparatus 1 may be increased. In such an embodiment, because the display apparatus 1 may display an image by being bent at the corner CN, an aesthetic sensibility may be improved.

Figure 3:
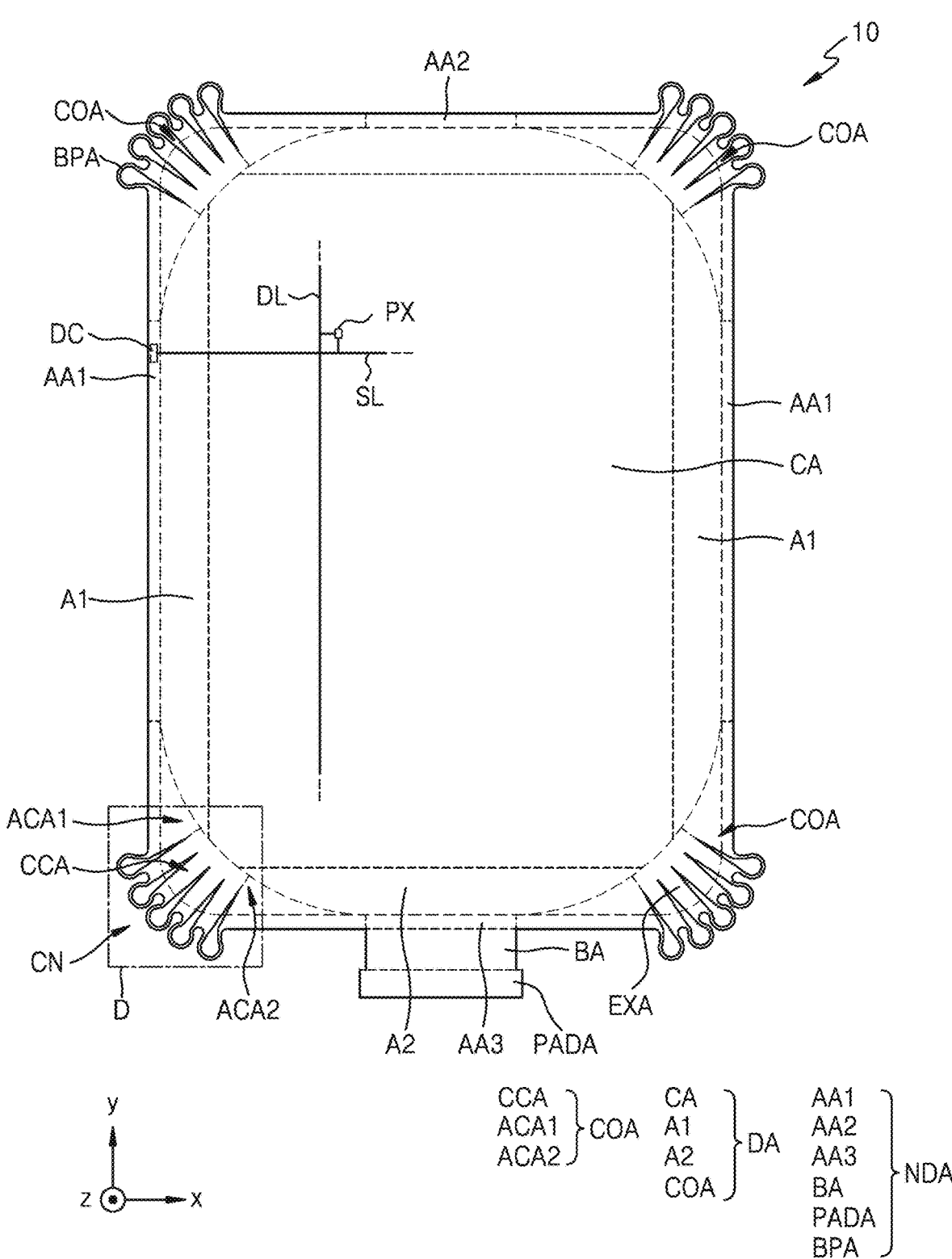
FIG. 3 is a schematic plan view of a display panel according to an embodiment.

FIG. 3 is a schematic plan view of the display panel 10 according to an embodiment. FIG. 3 is the schematic plan view of the display panel 10 in an unbent state.

Referring to FIG. 3, an embodiment of the display panel 10 may display an image. The display panel 10 may include a display area DA and a non-display area NDA. A pixel PX may be arranged in the display area DA. According to an embodiment, a plurality of pixels PX may be arranged in the display area DA. The pixel PX may not be arranged in the non-display area NDA. The display area DA may include a center area CA, a first adjacent area A1, a second adjacent area A2, and a corner area COA.

The center area CA may be flat. According to an embodiment, the display panel 10 may provide most of an image on the center area CA.

The first adjacent area A1 may be adjacent to the center area CA in a first direction (for example, an x direction or a −x direction). According to an embodiment, the first adjacent area A1 may extend from the center area CA in the first direction (for example, the x direction or the −x direction). According to an embodiment, the first adjacent area A1 may be provided in a multiple number, and the center area CA may be arranged between the plurality of first adjacent areas A1.

The second adjacent area A2 may be adjacent to the center area CA in a second direction (for example, a y direction or a −y direction). According to an embodiment, the second adjacent area A2 may extend from the center area CA in the second direction (for example, the y direction or the −y direction). According to an embodiment, the second adjacent area A2 may be provided in a multiple number, and the center area CA may be arranged between the plurality of second adjacent areas A2.

The corner area COA may be an area arranged at a corner CN of the display panel 10. According to an embodiment, the corner area COA may be arranged outside the center area CA. According to an embodiment, the corner area COA may at least partially surround the center area CA, the first adjacent area A1, and the second adjacent area A2. The corner area COA may include a central corner area CCA, a first adjacent corner area ACA1, and a second adjacent corner area ACA2.

The central corner area CCA may include a plurality of extension areas EXA, each extending in a direction away from the center area CA. According to an embodiment, the plurality of extension areas EXA may extend in a direction crossing the first direction (for example, the x direction or the −x direction) and/or the second direction (for example, the y direction or the −y direction). The plurality of extension areas EXA may be at least partially separated or spaced apart from each other. Thus, each of the plurality of extension areas EXA may have an edge.

In an embodiment, a component of the display panel 10 may not be arranged between the plurality of extension areas EXA that are adjacent to each other. In such an embodiment, an empty space may be defined between the adjacent plurality of extension areas EXA. In an embodiment where the central corner area CCA bends at the corner CN, the central corner area CCA may be affected by a compressive strain that is greater than a tensile strain. In an embodiment, because the component of the display panel 10 may not be arranged between adjacent extension areas EXA, the plurality of extension areas EXA may contract without being damaged. Thus, the display panel 10 may be bent at the central corner area CCA without being damaged.

The first adjacent corner area ACA1 may be adjacent to the central corner area CCA. According to an embodiment, the first adjacent corner area ACA1 may be arranged between the central corner area CCA and the first adjacent area A1. According to an embodiment, at least a portion of the first adjacent area A1 may be arranged between the center area CA and the first adjacent corner area ACA1 in the first direction (for example, the x direction or the −x direction). According to an embodiment, at least a portion of the first adjacent area A1 and the first adjacent corner area ACA1 may be arranged in the first direction (for example, the x direction or the −x direction).

The second adjacent corner area ACA2 may be adjacent to the central corner area CCA. According to an embodiment, the second adjacent corner area ACA2 may be spaced apart from the first adjacent corner area ACA1 with the central corner area CCA therebetween. The central corner area CCA may be arranged between the first adjacent corner area ACA1 and the second adjacent corner area ACA2. According to an embodiment, at least a portion of the second adjacent area A2 may be arranged between the center area CA and the second adjacent corner area ACA2 in the second direction (for example, the y direction or the −y direction). According to an embodiment, at least a portion of the second adjacent area A2 and the second adjacent corner area ACA2 may be arranged in the second direction (for example, the y direction or the −y direction).

The non-display area NDA may not display an image. The non-display area NDA may be arranged outside the display area DA. The non-display area NDA may at least partially surround the display area DA. According to an embodiment, the non-display area NDA may entirely surround the display area DA. The non-display area NDA may include a first peripheral area AA1, a second peripheral area AA2, a third peripheral area AA3, a bending area BA, a pad area PADA, and a bypass area BPA.

In an embodiment, the first peripheral area AA1 may be arranged outside the first adjacent area A1. In such an embodiment, the first adjacent area A1 may be arranged between the first peripheral area AA1 and the center area CA. According to an embodiment, the first peripheral area AA1 may extend from the first adjacent area A1 in the first direction (for example, the x direction or the –x direction). According to an embodiment, a driving circuit DC may be arranged in the first peripheral area AA1.

In an embodiment, the second peripheral area AA2 and the third peripheral area AA3 may be arranged outside the second adjacent area A2. In such an embodiment, the second adjacent area A2 may be arranged between the second peripheral area AA2 and the center area CA. In such an embodiment, the second adjacent area A2 may be arranged between the third peripheral area AA3 and the center area CA. The second peripheral area AA2 and the third peripheral area AA3 may extend from the second adjacent area A2 in the second direction (for example, the y direction or the –y direction). The center area CA may be arranged between the second peripheral area AA2 and the third peripheral area AA3.

In an embodiment, the bending area BA may be arranged outside the third peripheral area AA3. In such an embodiment, the third peripheral area AA3 may be arranged between the bending area BA and the second adjacent area A2. The display panel 10 may be bent in the bending area BA. In such an embodiment, in the bent display panel 10, the pad area PADA may face a rear surface of the display panel 10 that is the opposite to an upper surface of the display panel 10 that displays an image. Thus, an area of the non-display area NDA, which is seen by a user, may be reduced.

In an embodiment, the pad area PADA may be arranged outside the bending area BA. In such an embodiment, the bending area BA may be arranged between the third peripheral area AA3 and the pad area PADA. A pad (not shown) may be arranged in the pad area PADA. Thus, the display panel 10 may receive an electrical signal and/or a power voltage from a circuit board.

The bypass area BPA may at least partially surround the corner area COA. According to an embodiment, the bypass area BPA may at least partially surround the central corner area CCA. According to an embodiment, the bypass area BPA may be provided in plural, and the plurality of bypass areas BPA may at least partially surround the plurality of corner areas COA, respectively. The bypass area BPA may extend from the first adjacent corner area ACA1 to the second adjacent corner area ACA2.

At least a portion of the bypass area BPA may have a round shape. According to an embodiment, at least a portion of an edge of the bypass area BPA may extend to have a round shape. According to an embodiment, the bypass area BPA may extend in a serpentine shape. Thus, in a case where the corner area COA bends, the damage to the bypass area BPA may be effectively prevented or substantially reduced.

A bypass line may be arranged in the bypass area BPA. According to an embodiment, the bypass line may be a line configured to transmit a power voltage or a signal to the pixel PX. According to an alternative embodiment, the bypass line may be a test line configured to test the reliability of the display panel 10. According to another alternative embodiment, the bypass line may be a touch sensor line configured to transmit a signal of a touch sensor layer included in the display panel 10.

According to an embodiment, the bypass area BPA and the plurality of extension areas EXA may be integrally formed with each other as a single unitary unit. The bypass area BPA may extend from each of the plurality of extension areas EXA. The bypass area BPA and the plurality of extension areas EXA may be connected to each other. In such an embodiment, the bypass lines arranged in the bypass area BPA may transmit a power voltage and/or a signal to the plurality of extension areas EXA.

The pixel PX may include a display element. According to an embodiment, a plurality of pixels PX may include a plurality of display elements. According to an embodiment, the display element may include an organic light-emitting diode including an organic emission layer. Alternatively, the display element may include a light-emitting diode including an inorganic emission layer. A size of the light-emitting diode may be a micro-scale or a nano-scale. In an embodiment, for example, the light-emitting diode may include a micro-light-emitting diode. Alternatively, the light-emitting diode may include a nanorod-light-emitting diode. The nanorod-light-emitting diode may include GaN. According to an embodiment, a color conversion layer may be arranged on the nanorod-light-emitting diode. The color conversion layer may include quantum dots. Alternatively, the display element may include a quantum dot light-emitting diode including a quantum dot emission layer.

The pixel PX may include a plurality of sub-pixels, and each of the plurality of sub-pixels may emit a predetermined color of light by using the display element. Herein, a sub-pixel denotes a smallest unit for realizing an image, which corresponds to an emission area. In an embodiment where the organic light-emitting diode is implemented as the display element, the emission area may be defined by an opening of a pixel-defining layer, which will be described below in detail.

The pixel PX may receive a scan signal through a scan line SL. According to an embodiment, the scan line SL may extend in the first direction (for example, the x direction or the –x direction). According to an embodiment, the scan line SL may extend from a driving circuit DC. In such an embodiment, the driving circuit DC may supply a scan signal. The pixel PX may receive a data signal through a data line DL. According to an embodiment, the data line DL may extend in the second direction (for example, the y direction or the –y direction). According to an embodiment, the data line DL may extend from the driving circuit DC. In such an embodiment, the driving circuit DC may supply a data signal.

At least one of the first adjacent area A1, the second adjacent area A2, the corner area COA, and the non-display area NDA may be bent. In an embodiment, for example, portions of the first adjacent area A1, the first adjacent corner area ACA1, and the non-display area NDA may be bent on a section (for example, an x-z section) in the first direction (for example, the x direction or the –x direction). Portions of the second adjacent area A2, the second adjacent corner area ACA2, and the non-display area NDA may be bent on a section (for example, a y-z section) in the second direction (for example, the y direction or the –y direction). The central corner area CCA and the bypass area BPA may be bent on the section (for example, the x-z section) in the first direction (for example, the x direction or the –x direction) and may be bent on the section (for example, the y-z section) in the second direction (for example, the y direction or the −y direction).

In the corner area COA, a line or a driving circuit configured to transmit a power voltage or a signal to the pixel PX may be arranged. According to an embodiment, the bypass line is arranged in the bypass area BPA, such that an area of the corner area COA, the area of the corner area COA being occupied by the line, may be reduced. In such an embodiment, the empty area between the adjacent extension areas EXA may further extend from the central corner area CCA to the center area CA, and the amount of stress generated in the central corner area CCA may be reduced. Thus, the reliability of the display panel 10 may be increased. In an embodiment, the bypass line may transmit a power voltage or a signal to the pixel PX, and thus, the resistance of a line configured to transmit a power voltage and/or a signal to the pixel PX may be reduced.

The bypass area BPA may be included in the non-display area NDA and may overlap the light blocking area BLA (see FIG. 2C), in a state where the cover window 20 (see FIG. 2C) is arranged on the display panel 10. Thus, the bypass area BPA may not be seen.

Figure 4:
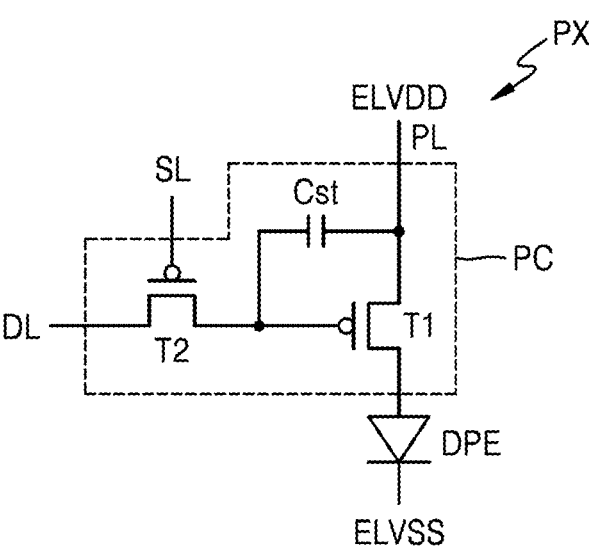
FIG. 4 is a schematic equivalent circuit diagram of a pixel which may be applied to a display panel.

FIG. 4 is a schematic equivalent circuit diagram of a pixel PX which may be applied to a display panel.

Referring to FIG. 4, an embodiment of the pixel PX may include a pixel circuit PC and a display element DPE. The pixel circuit PC may be electrically connected to the display element DPE. The pixel circuit PC may include a driving thin-film transistor T1, a switching thin-film transistor T2, and a storage capacitor Cst. According to an embodiment, the display element DPE may emit red, green, or blue light or red, green, blue, or white light.

The switching thin-film transistor T2 may be connected to a scan line SL and a data line DL and may be configured to transmit a data signal or a data voltage input through the data line DL, to the driving thin-film transistor T1, in response to a scan signal or a switching voltage input through the scan line SL.

The storage capacitor Cst may be connected to the switching thin-film transistor T2 and a driving voltage line PL and may be configured to store a voltage corresponding to a difference between a voltage received from the switching thin-film transistor T2 and a first power voltage ELVDD supplied to the driving voltage line PL.

The driving thin film transistor T1 may be connected to the driving voltage line PL and the storage capacitor Cst and may control a driving current flowing from the driving voltage line PL through the display element DPE, in correspondence with a value of the voltage stored in the storage capacitor Cst. The display element DPE may emit light having a predetermined brightness based on the driving current. An opposite electrode of the display element DPE may receive a second power voltage ELVSS.

FIG. 4 illustrates an embodiment where the pixel circuit PC includes two thin-film transistors and a single storage capacitor. However, in an alternative embodiment, the pixel circuit PC may include more thin-film transistors than the thin-film transistors illustrated in FIG. 4.

Figure 5A:
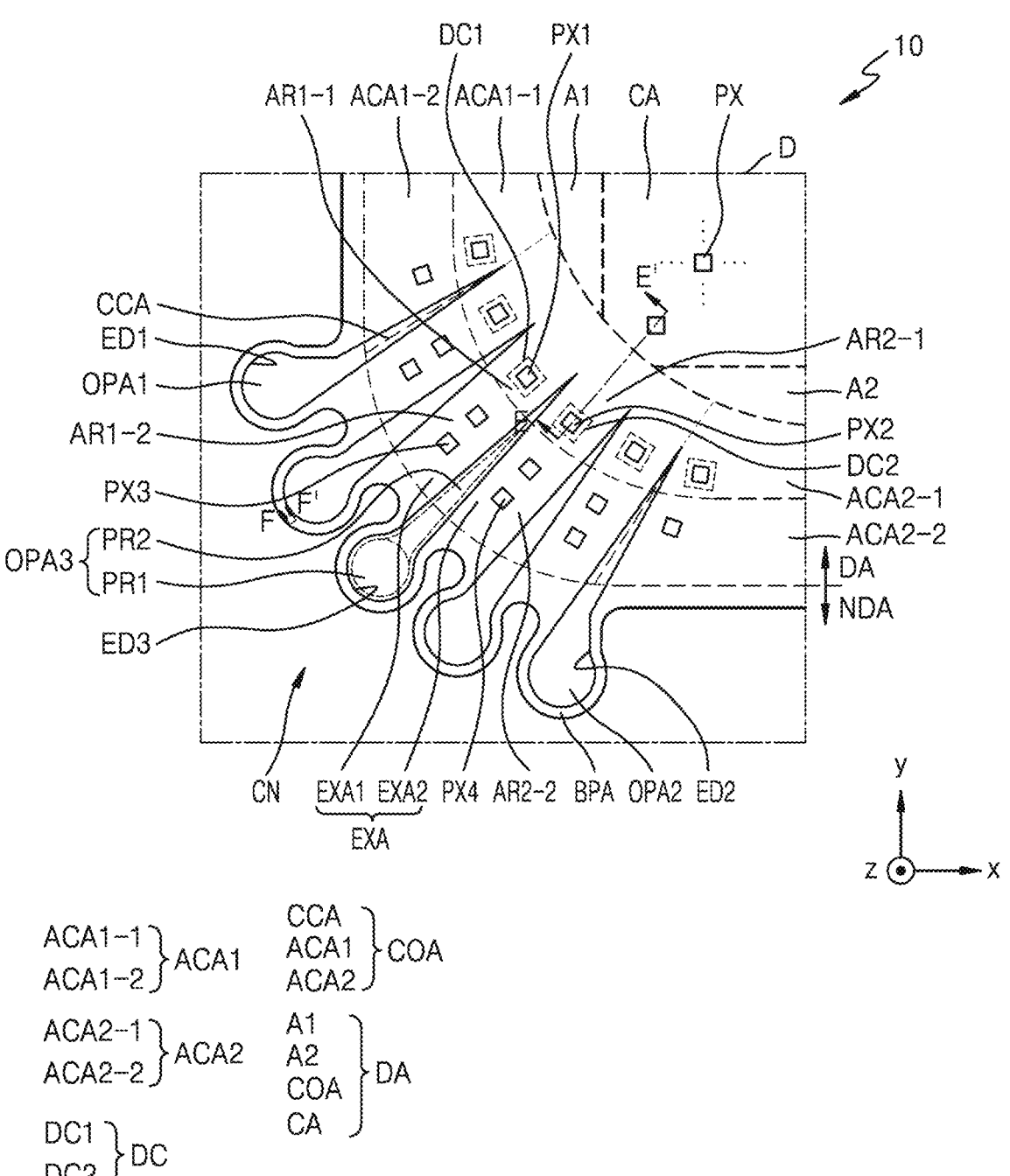
FIGS. 5A and 5B are enlarged views of a region D of the display panel of FIG. 3, according to various embodiments.
Figure 5B:
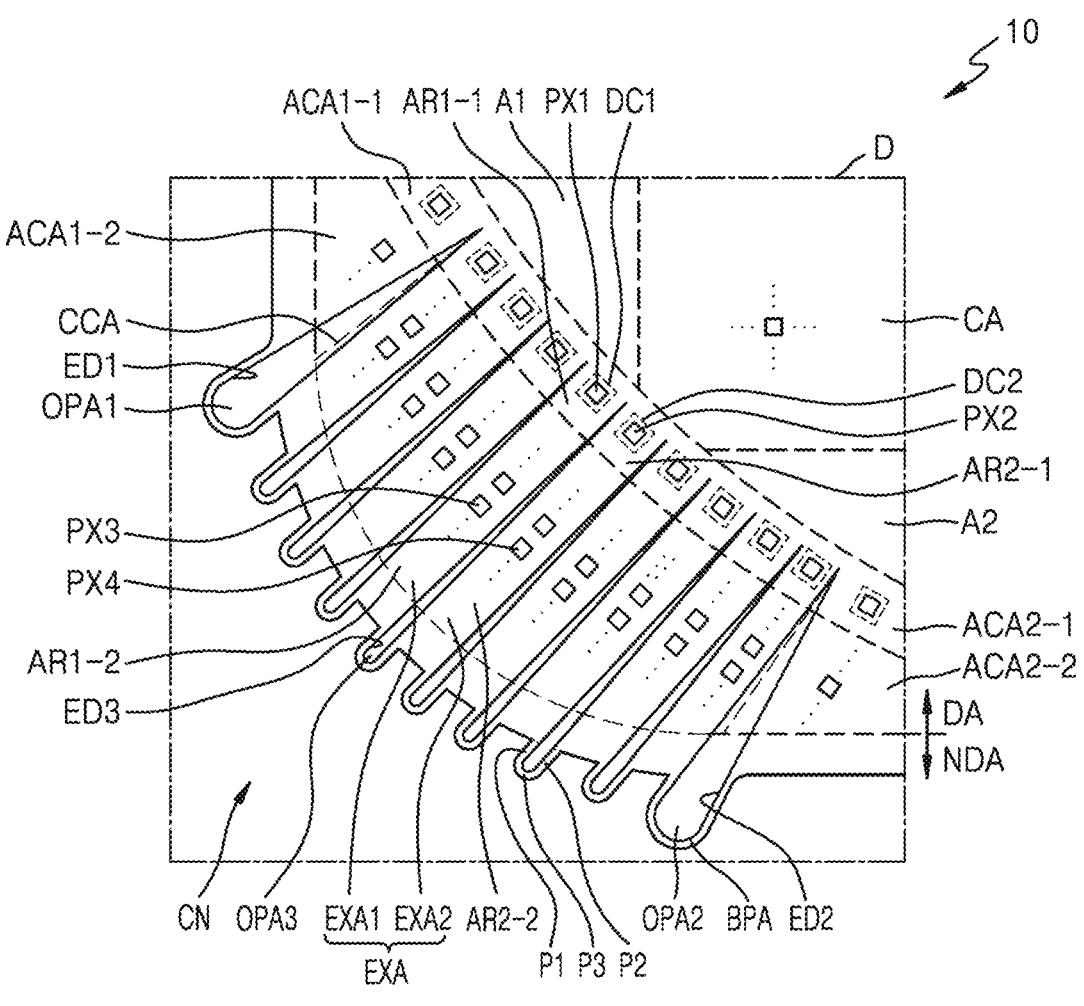

FIGS. 5A and 5B are enlarged views of a region D of the display panel 10 of FIG. 3, according to various embodiments. In FIGS. 5A and 5B, the same or like reference characters as those in FIG. 3 denote the same or like elements, and any repetitive detailed description thereof will be omitted or simplified.

Referring to FIGS. 5A and 5B, an embodiment of the display panel 10 may include the display area DA and the non-display area NDA. The display panel 10 may include the pixel PX and the driving circuit DC. The pixel PX may be arranged (or disposed) in the display area DA. According to an embodiment, the plurality of pixels PX may be arranged in the display area DA. The pixel PX may not be arranged in the non-display area NDA. The display area DA may include the center area CA, the first adjacent area A1, the second adjacent area A2, and the corner area COA.

The corner area COA may be an area arranged (or defined) at the corner CN of the display panel 10. According to an embodiment, the corner area COA may be arranged outside the center area CA. According to an embodiment, the corner area COA may at least partially surround the center area CA, the first adjacent area A1, and the second adjacent area A2. The corner area COA may include the central corner area CCA, the first adjacent corner area ACA1, and the second adjacent corner area ACA2.

The central corner area CCA may include the plurality of extension areas EXA, each extending in a direction away from the center area CA. According to an embodiment, the plurality of extension areas EXA may extend in a direction crossing the first direction (for example, the x direction or the −x direction) and/or the second direction (for example, the y direction or the −y direction). The plurality of extension areas EXA may be at least partially separated or spaced apart from each other. Thus, each of the plurality of extension areas EXA may have an edge. A component of the display panel 10 may not be arranged between the adjacent extension areas EXA. In such an embodiment, an empty space may be defined between the adjacent extension areas EXA.

The plurality of extension areas EXA may include a first extension area EXA1 and a second extension area EXA2 adjacent to each other. The first extension area EXA1 may include a first inner area AR1-1 and a first outer area AR1-2. The first inner area AR1-1 may be arranged (or disposed) between the first outer area AR1-2 and the center area CA. The second extension area EXA2 may include a second inner area AR2-1 and a second outer area AR2-2. The second inner area AR2-1 may be arranged between the second outer area AR2-2 and the center area CA.

The plurality of pixels PX may include a first pixel PX1, a second pixel PX2, a third pixel PX3, and a fourth pixel PX4. According to an embodiment, the first pixel PX1 and the third pixel PX3 may be arranged in the first extension area EXA1. The first pixel PX1 may be arranged in the first inner area AR1-1, and the third pixel PX3 may be arranged in the first outer area AR1-2. The second pixel PX2 and the fourth pixel PX4 may be arranged in the second extension area EXA2. The second pixel PX2 may be arranged in the second inner area AR2-1, and the fourth pixel PX4 may be arranged in the second outer area AR2-2.

The first adjacent corner area ACA1 may be adjacent to the central corner area CCA. According to an embodiment, the first adjacent corner area ACA1 may be arranged between the central corner area CCA and the first adjacent area A1. According to an embodiment, at least a portion of the first adjacent area A1 may be arranged between the center area CA and the first adjacent corner area ACA1 in the first direction (for example, the x direction or the −x direction). According to an embodiment, at least a portion of the first adjacent area A1 and the first adjacent corner area ACA1 may be arranged in the first direction (for example, the x direction or the −x direction). According to an embodiment, the first adjacent corner area ACA1 may include a first inner corner area ACA1-1 and a first outer corner area ACA1-2. The first inner corner area ACA1-1 may be arranged between the first outer corner area ACA1-2 and the first adjacent area A1. The pixel PX may be arranged in each of the first inner corner area ACA1-1 and the first outer corner area ACA1-2.

The second adjacent corner area ACA2 may be adjacent to the central corner area CCA. According to an embodiment, the second adjacent corner area ACA2 may be spaced apart from the first adjacent corner area ACA1 with the central corner area CCA therebetween. The central corner area CCA may be arranged between the first adjacent corner area ACA1 and the second adjacent corner area ACA2. According to an embodiment, at least a portion of the second adjacent area A2 may be arranged between the center area CA and the second adjacent corner area ACA2 in the second direction (for example, the y direction or the –y direction). According to an embodiment, at least a portion of the second adjacent area A2 and the second adjacent corner area ACA2 may be arranged in the second direction (for example, the y direction or the –y direction). The second adjacent corner area ACA2 may include a second inner corner area ACA2-1 and a second outer corner area ACA2-2. The second inner corner area ACA2-1 may be arranged between the second outer corner area ACA2-2 and the second adjacent area A2. The pixel PX may be arranged in each of the second inner corner area ACA2-1 and the second outer corner area ACA2-2.

The non-display area NDA may not display an image. The non-display area NDA may be arranged outside the display area DA. The non-display area NDA may at least partially surround the display area DA. The non-display area NDA may include the bypass area BPA extending from the first adjacent corner area ACA1 to the second adjacent corner area ACA2 to at least partially surround the central corner area CCA.

At least a portion of the bypass area BPA may have a round shape. According to an embodiment, at least a portion of an edge of the bypass area BPA may extend to have a round shape. According to an embodiment, the bypass area BPA may extend in a serpentine shape. Thus, when the corner area COA bends, the damage to the bypass area BPA may be effectively prevented or substantially reduced.

The bypass area BPA may extend to each of the plurality of extension areas EXA. According to an embodiment, the bypass area BPA and the plurality of extension areas EXA may be integrally formed with each other as a single unitary unit. In such an embodiment, the first adjacent corner area ACA1 and the extension area EXA adjacent to the first adjacent corner area ACA1 may be integrally formed with each other via the bypass area BPA. The second adjacent corner area ACA2 and the extension area EXA adjacent to the second adjacent corner area ACA2 may be integrally formed with each other via the bypass area BPA. The adjacent extension areas EXA may be integrally formed with each other via the bypass area BPA.

A bypass line may be arranged in the bypass area BPA. According to an embodiment, the bypass line may be a line configured to transmit a power voltage or a signal to the pixel PX. According to an alternative embodiment, the bypass line may be a test line configured to test the reliability of the display panel 10. According to another alternative embodiment, the bypass line may be a touch sensor line configured to transmit a signal of a touch sensor layer included in the display panel 10.

A first opening area OPA1 may be defined as an area surrounded by the first adjacent corner area ACA1, a corresponding one of the plurality of extension areas EXA adjacent to the first adjacent corner area ACA1, and the bypass area BPA. A component of the display panel 10 may not be arranged in the first opening area OPA1. The first opening area OPA1 may have a first edge ED1. The first edge ED1 may include a portion of an edge of the first adjacent corner area ACA1, a portion of an edge of any one of the plurality of extension areas adjacent to the first adjacent corner area ACA1, and a portion of an edge of the bypass area BPA. The portion of the edge of the first adjacent corner area ACA1 may be connected to the portion of the edge of the corresponding one of the plurality of extension areas adjacent to the first adjacent corner area ACA1. The portion of the edge of the corresponding one of the plurality of extension areas EXA adjacent to the first adjacent corner area ACA1 may be connected to the portion of the edge of the bypass area BPA. The portion of the edge of the bypass area BPA may be connected to the portion of the edge of the first adjacent corner area ACA1.

A second opening area OPA2 may be defined as an area surrounded by the second adjacent corner area ACA2, a corresponding one of the plurality of extension areas EXA adjacent to the second adjacent corner area ACA2, and the bypass area BPA. A component of the display panel 10 may not be arranged in the second opening area OPA2. The second opening area OPA2 may have a second edge ED2. The second edge ED2 may include a portion of an edge of the second adjacent corner area ACA2, a portion of an edge of the corresponding one of the plurality of extension areas adjacent to the second adjacent corner area ACA2, and a portion of an edge of the bypass area BPA. The portion of the edge of the second adjacent corner area ACA2 may be connected to the portion of the edge of the corresponding one of the plurality of extension areas adjacent to the second adjacent corner area ACA2. The portion of the edge of the corresponding one of the plurality of extension areas EXA adjacent to the second adjacent corner area ACA2 may be connected to the portion of the edge of the bypass area BPA. The portion of the edge of the bypass area BPA may be connected to the portion of the edge of the second adjacent corner area ACA2.

A third opening area OPA3 may be defined as an area surrounded by the first extension area EXA1, the second extension area EXA2, and the bypass area BPA. The third opening area OPA3 may have a third edge ED3. The third edge ED3 may include a portion of an edge of the first extension area EXA1, a portion of an edge of the second extension area EXA2, and a portion of an edge of the bypass area BPA. The portion of the edge of the first extension area EXA1 may be connected to the portion of the edge of the second extension area EXA2. The portion of the edge of the second extension area EXA2 may be connected to the portion of the edge of the bypass area BPA. The portion of the edge of the bypass area BPA may be connected to the portion of the edge of the first extension area EXA1.

Referring to FIG. 5A, in an embodiment, a portion of the bypass area BPA may have a substantially circular or oval shape. In such an embodiment, the third opening area OPA3 may include a first partial area PR1 having a substantially circular shape and a second partial area PR2 extending from the first partial area PR1 between the first extension area EXA1 and the second extension area EXA2.

According to an embodiment, at least a portion of the bypass area BPA extending from the first adjacent corner area ACA1 may extend in the first direction (for example, the x direction or the –x direction). According to an embodiment, at least a portion of the bypass area BPA extending from the second adjacent corner area ACA2 may extend in the second direction (for example, the y direction or the −y direction).

Referring to FIG. 5B, in an embodiment, a portion of the bypass area BPA may extend in a direction in which a corresponding one of the plurality of extension areas EXA may extend. In an embodiment, for example, a first portion P1 of the bypass area BPA may extend in a direction in which one of the plurality of extension areas EXA may extend. A second portion P2 of the bypass area BPA may extend in a direction in which another of the plurality of extension areas EXA, which is adjacent to the one of the plurality of extension areas EXA, may extend. A third portion P3 of the bypass area BPA may extend from the first portion P1 to the second portion P2. In such an embodiment, the first portion P1, the second portion P2, and the third portion P3 may be integrally formed with one another.

A portion of the bypass area BPA extending from the first adjacent corner area ACA1 may extend in a direction away from the center area CA. A portion of the bypass area BPA extending from the first adjacent corner area ACA1 may extend in a direction crossing the first direction (for example, the x direction or the −x direction) and the second direction (for example, the y direction or the −y direction).

A portion of the bypass area BPA extending from the second adjacent corner area ACA2 may extend in a direction away from the center area CA. A portion of the bypass area BPA extending from the second adjacent corner area ACA2 may extend in a direction crossing the first direction (for example, the x direction or the −x direction) and the second direction (for example, the y direction or the −y direction).

In such an embodiment, as described above, the shape of the bypass area BPA may be variously modified based on the number of extension areas EXA included in the central corner area CCA.

Referring to FIGS. 5A and 5B, the driving circuit DC may be provided in plural. The plurality of driving circuits DC may be arranged to surround the central area CA, the first adjacent area A1, and the second adjacent area A2. According to an embodiment, the plurality of driving circuits DC may include a first driving circuit DC1 and a second driving circuit DC2. The first driving circuit DC1 may be arranged (or disposed) in the first extension area EXA1 and may overlap the first pixel PX1. According to an embodiment, first driving circuit DC1 may be arranged in the first inner area AR1-1 and may overlap the first pixel PX1. According to an embodiment, the third pixel PX3 may not overlap the first driving circuit DC1. The second driving circuit DC2 may be arranged in the second extension area EXA2 and may overlap the second pixel PX2. According to an embodiment, the second driving circuit DC2 may be arranged in the second inner area AR2-1 and may overlap the second pixel PX2. According to an embodiment, the fourth pixel PX4 may not overlap the second driving circuit DC2.

The third opening area OPA3 may extend between the first driving circuit DC1 and the second driving circuit DC2. Thus, at least a portion of the third opening area OPA3 may be arranged between the first driving circuit DC1 and the second driving circuit DC2.

The driving circuit DC may be arranged in the first inner corner area ACA1-1. The pixel PX arranged in the first inner corner area ACA1-1 may overlap the driving circuit DC. According to an embodiment, the pixel PX arranged in the first outer corner area ACA1-2 may not overlap the driving circuit DC. According to an embodiment, the first opening area OPA1 may extend between the adjacent driving circuits DC, similarly with the third opening area OPA3. Thus, at least a portion of the first opening area OPA1 may be arranged between the adjacent driving circuits DC.

The driving circuit DC may be arranged in the second inner corner area ACA2-1. The pixel PX arranged in the second inner corner area ACA2-1 may overlap the driving circuit DC. According to an embodiment, the pixel PX arranged in the second outer corner area ACA2-2 may not overlap the driving circuit DC. According to an embodiment, the second opening area OPA2 may extend between the adjacent driving circuits DC, similarly with the third opening area OPA3. Thus, at least a portion of the second opening area OPA2 may be arranged between the adjacent driving circuits DC.

According to an embodiment, the bypass line is arranged in the bypass area BPA, such that an area of the corner area COA, the area of the corner area COA being occupied by the line and/or the driving circuit DC, may be reduced. In such an embodiment, a power voltage and/or a signal may be transmitted to the plurality of pixels PX arranged in the corner area COA through the bypass line arranged in the bypass area BPA. In such an embodiment, various driving circuits DC and the plurality of pixels PX may be arranged in the corner area COA.

In such an embodiment, because the bypass area BPA may be arranged outside the corner area COA, each of the first opening area OPA1, the second opening area OPA2, and the third opening area OPA3 may further extend toward the center area CA. Thus, when the central corner area CCA bends, the amount of stress generated in the central corner area CCA may be reduced, and the reliability of the display panel 10 may be increased. In such an embodiment, the bypass line may transmit a power voltage or a signal to the pixel PX, and thus, the resistance of a line configured to transmit a power voltage and/or a signal to the pixel PX may be reduced.

Figure 6:
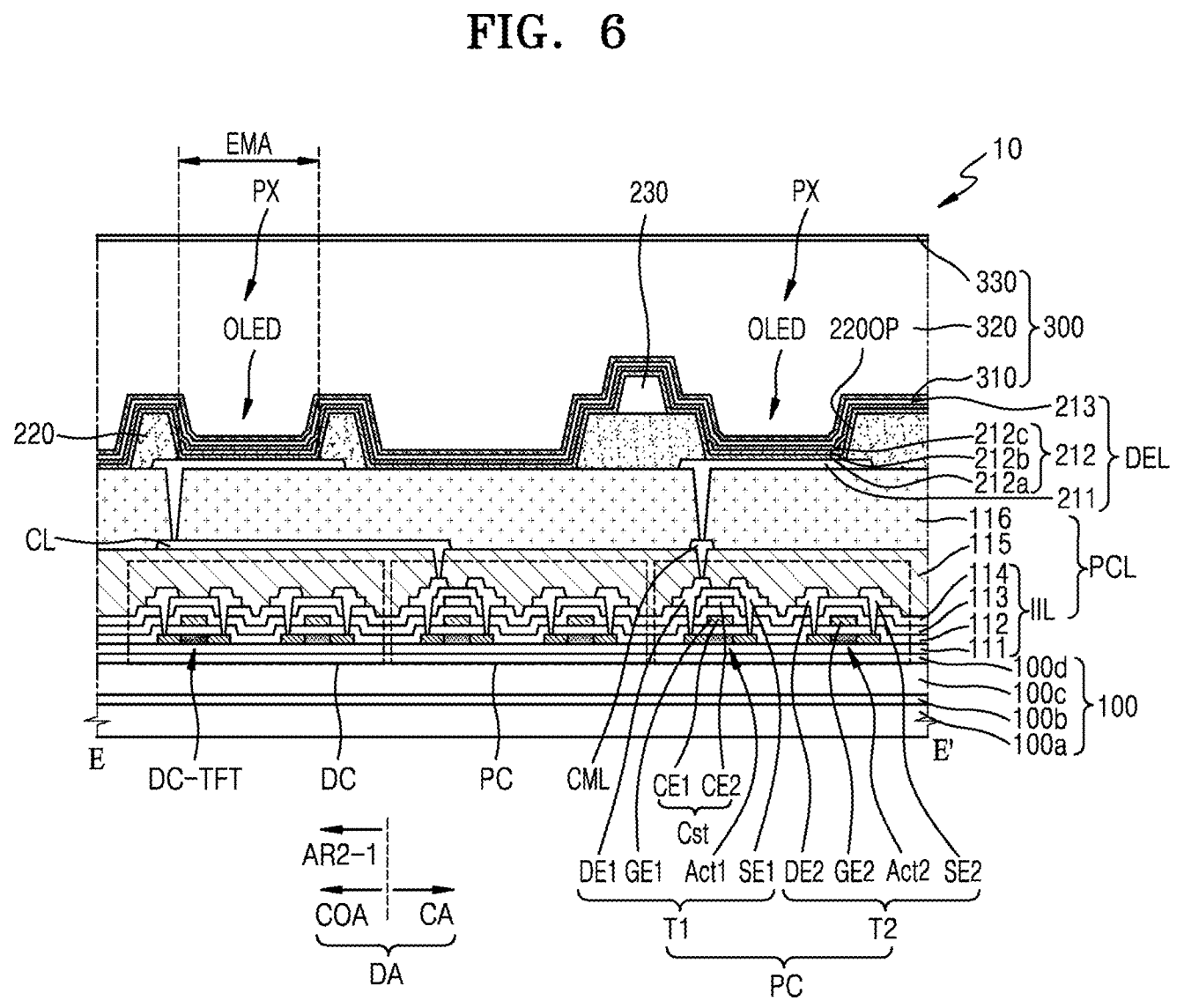

FIG. 6 is a schematic cross-sectional view of the display panel 10 of FIG. 5A, taken along line E-E'.

Referring to FIG. 6, an embodiment of the display panel 10 may include the display area DA. The plurality of pixels PX may be arranged in the display area DA. The display area DA may include the center area CA and the corner area COA. The corner area COA may include the plurality of extension areas EXA (see FIG. 5A). The plurality of extension areas EXA may include the first extension area EXA1 (see FIG. 5A) and the second extension area EXA2 (see FIG. 5A) adjacent to each other. The second extension area EXA2 may include the second inner area AR2-1 and the second outer area AR2-2 (see FIG. 5A). According to an embodiment, the second inner area AR2-1 may be arranged between the second outer area AR2-2 and the center area CA. The display panel 10 may include a substrate 100, a pixel circuit layer PCL, a display element layer DEL, and an encapsulation layer 300, in the display area DA.

The substrate 100 may include a first base layer 100a, a first barrier layer 100b, a second base layer 100c, and a second barrier layer 100d. According to an embodiment, the first base layer 100a, the first barrier layer 100b, the second base layer 100c, and the second barrier layer 100d may be sequentially stacked on the substrate 100. According to an alternative embodiment, the substrate 100 may include glass.

At least one of the first base layer 100a and the second base layer 100c may include polymer resins, such as polyethersulfone, polyarylate, polyetherimide, polyethylene naphthalate, polyethylene terephthalate, polyphenylene sulfide, polyimide, polycarbonate, cellulose tri acetate, or cellulose acetate propionate.

The first barrier layer 100b and the second barrier layer 100d may prevent the penetration of external impurities and may have a single layer structure or a multilayer structure, each layer therein including an inorganic material, such as silicon nitride (SiN$_x$), silicon oxide (SiO$_2$), and/or silicon oxynitride (SiON).

The pixel circuit layer PCL may be arranged (or disposed) on the substrate 100. The pixel circuit layer PCL may include the driving circuit DC and the pixel circuit PC. According to an embodiment, the driving circuit DC may be arranged in the second inner area AR2-1.

The pixel circuit PC may be arranged on the center area CA. According to an embodiment, the pixel circuit PC may be arranged to be spaced apart from the second inner area AR2-1. In such an embodiment, the pixel circuit PC may not overlap the second inner area AR2-1. According to an alternative embodiment, the pixel circuit PC may overlap the second inner area AR2-1.

The driving circuit DC may include a driving circuit thin-film transistor DC-TFT. According to an embodiment, the driving circuit DC may be connected to a scan line. According to an embodiment, the driving circuit DC may supply a scan signal to the pixel circuit PC through the scan line. The pixel circuit PC may include at least one thin-film transistor. According to an embodiment, the pixel circuit PC may include the driving thin-film transistor T1, the switching thin-film transistor T2, and the storage capacitor Cst.

The pixel circuit layer PCL may further include an inorganic insulating layer IIL, an intermediate organic insulating layer 115, and an organic insulating layer 116 arranged below or/and above components of the driving thin-film transistor T1. The inorganic insulating layer IIL may include a buffer layer 111, a first gate insulating layer 112, a second gate insulating layer 113, and an interlayer insulating layer 114. The driving thin-film transistor T1 may include a first semiconductor layer Act1, a first gate electrode GE1, a first source electrode SE1, and a first drain electrode DE1.

The buffer layer 111 may be arranged on the substrate 100. The buffer layer 111 may include an inorganic insulating material, such as SiN$_x$, SiON, and SiO$_2$, and may have a single layer structure or a multilayer structure, each layer therein including at least one selected from the inorganic insulating materials described above.

The first semiconductor layer Act1 may be arranged on the buffer layer 111. The first semiconductor layer Act1 may include polysilicon. Alternatively, the first semiconductor layer Act1 may include amorphous silicon, an oxide semiconductor, or an organic semiconductor. The first semiconductor layer Act1 may include a channel area, a drain area and a source area arranged at opposing sides of the channel area, respectively.

The first gate electrode GE1 may overlap the channel area. The first gate electrode GE1 may include a low-resistance metal material. The first gate electrode GE1 may include a conductive material including Mo, Al, Cu, Ti, etc. and may have a single layer structure or a multilayer structure, each layer therein including at least one selected from the conductive materials described above.

The first gate insulating layer 112 between the first semiconductor layer Act1 and the first gate electrode GE1 may include an inorganic insulating material, such as SiO$_2$, SiN$_x$, SiON, Al$_2$O$_3$, TiO$_2$, Ta$_2$O$_5$, HfO$_2$, and/or ZnO.

The second gate insulating layer 113 may cover the first gate electrode GE1. The second gate insulating layer 113 may include an inorganic insulating material, such as SiO$_2$, SiN$_x$, SiON, Al$_2$O$_3$, TiO$_2$, Ta$_2$O$_5$, HfO$_2$, and/or ZnO, similarly with the first gate insulating layer 112.

An upper electrode CE2 of the storage capacitor Cst may be arranged above the second gate insulating layer 113. The upper electrode CE2 may overlap the first gate electrode GE1 therebelow. In such an embodiment, the first gate electrode GE1 of the driving thin-film transistor T1 and the upper electrode CE2, the first gate electrode GE1 and the upper electrode CE2 overlapping each other with the second gate insulating layer 113 therebetween, may be included in the storage capacitor Cst. In such an embodiment, the first gate electrode GE1 of the driving thin-film transistor T1 may function as a lower electrode CE1 of the storage capacitor Cst. In such an embodiment, the storage capacitor Cst and the driving thin-film transistor T1 may overlap each other. In an embodiment, the storage capacitor Cst may not overlap the driving thin-film transistor T1. The upper electrode CE2 may include Al, Pt, Pd, Ag, Mg, Au, Ni, Nd, Ir, Cr, Ca, Mo, Ti, W, and/or Cu and may have a single layer structure or a multilayer structure, each layer therein including at least one selected from the materials described above.

The interlayer insulating layer 114 may cover the upper electrode CE2. The interlayer insulating layer 114 may include SiO$_2$, SiN$_x$, SiON, Al$_2$O$_3$, TiO$_2$, Ta$_2$O$_5$, HfO$_2$, ZnO, or the like. The interlayer insulating layer 114 may have a single layer structure or a multilayer structure, each layer therein including at least one selected from the inorganic insulating materials described above.

Each of the first drain electrode DE1 and the first source electrode SE1 may be arranged on the interlayer insulating layer 114. The first drain electrode DE1 and the first source electrode SE1 may include a highly conductive material. The first drain electrode DE1 and the first source electrode SE1 may include a conductive material including Mo, Al, Cu, Ti, etc. and may have a single layer structure or a multilayer structure, each layer therein including at least one selected from the materials described above. According to an embodiment, the first drain electrode DE1 and the first source electrode SE1 may have a multilayer structure of Ti/Al/Ti.

The switching thin-film transistor T2 may include a second semiconductor layer Act2, a second gate electrode GE2, a second drain electrode DE2, and a second source electrode SE2. The second semiconductor layer Act2, the second gate electrode GE2, the second drain electrode DE2, and the second source electrode SE2 may be substantially the same as the first semiconductor layer Act1, the first gate electrode GE1, the first drain electrode DE1, and the first source electrode SE1, respectively, and thus, are not described in detail.

Similarly with the switching thin-film transistor T2, the driving circuit thin-film transistor DC-TFT may include a driving circuit semiconductor layer, a driving circuit gate electrode, a driving circuit source electrode, and a driving circuit drain electrode.

The intermediate organic insulating layer 115 may be arranged on at least one thin-film transistor. According to an embodiment, the intermediate organic insulating layer 115 may be arranged to cover the first drain electrode DE1 and the first source electrode SE1. The intermediate organic insulating layer 115 may include an organic material. In an embodiment, for example, the intermediate organic insulating layer 115 may include an organic insulating material, such as a general-purpose polymer such as polymethylmethacrylate ("PMMA") or polystyrene ("PS"), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

A connection electrode CML and a connection line CL may be arranged on the intermediate organic insulating layer 115. Here, each of the connection electrode CML and the connection line CL may be connected to the first drain electrode DE1 or the first source electrode SE1 through a contact hole defined in the intermediate organic insulating layer 115. The connection electrode CML and the connection line CL may include a highly conductive material. The connection electrode CM and the connection line CL may include a conductive material including Mo, Al, Cu, Ti, etc. and may have a single layer structure or a multilayer structure, each layer therein including at least one selected from the materials described above. According to an embodiment, the connection electrode CML and the connection line CL may have a multilayer structure of Ti/Al/Ti.

According to an embodiment, the connection line CL may extend from the center area CA to the second inner area AR2-1. According to an alternative embodiment, the connection line CL may extend from the first adjacent area A1 (see FIG. 5A), the second adjacent area A2 (see FIG. 5A), the first adjacent corner area ACA1 (see FIG. 5A), the second adjacent corner area ACA2 (see FIG. 5A), and/or the second outer area AR2-2 (see FIG. 5A) to the second inner area AR2-1. The connection line CL may overlap the driving circuit thin-film transistor DC-TFT.

The organic insulating layer 116 may be arranged to cover the connection electrode CML and the connection line CL. The organic insulating layer 116 may include an organic material. The organic insulating layer 116 may include an organic insulating material, such as a general-purpose polymer such as PMMA or PS, a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

The display element layer DEL may be arranged on the pixel circuit layer PCL. The display element layer DEL may include an organic light-emitting diode OLED as a display element, and may include a pixel-defining layer 220 and a spacer 230. According to an embodiment, the display element layer DEL may include a plurality of organic light-emitting diodes OLED as a plurality of display elements of the plurality of pixels PX. According to an embodiment, one of the plurality of organic light-emitting diodes OLED may be arranged in the center area CA. Another of the plurality of organic light-emitting diodes OLED may be arranged in the second inner area AR2-1. Thus, according to the present embodiment, the display panel 10 may also display an image on the second inner area AR2-1 in which the driving circuit DC may be arranged.

The organic light-emitting diode OLED may be electrically connected to the connection electrode CML through a contact hole defined in the organic insulating layer 116. The organic light-emitting diode OLED may be electrically connected to the connection line CL through a contact hole defined in the organic insulating layer 116. The organic light-emitting diode OLED may include a first electrode 211, an intermediate layer 212, and a second electrode 213.

The first electrode 211 may be arranged on the organic insulating layer 116. The first electrode 211 may be electrically connected to the connection electrode CML or the connection line CL through a contact hole defined in the organic insulating layer 116. According to an embodiment, the first electrode 211 may be a pixel electrode. The first electrode 211 may include a conductive oxide, such as indium tin oxide ("ITO"), indium zinc oxide ("IZO"), zinc oxide (ZnO), indium oxide ($In_2O_3$), indium gallium oxide ("IGO"), or aluminum zinc oxide ("AZO"). According to an alternative embodiment, the first electrode 211 may include a reflective layer including Ag, Mg, Al, Pt, Pd, Au, Ni, Nd, Ir, Cr, or a compound thereof. According to another alternative embodiment, the first electrode 211 may further include a layer including ITO, IZO, ZnO, or $In_2O_3$, above/below the reflective layer described above.

The pixel-defining layer 220 may be arranged on the first electrode 211, and an opening 220OP is defined through the pixel-defining layer 220 to expose a central portion of the first electrode 211. The opening 220OP may define an emission area (hereinafter, referred to as an emission area EMA) of light emitted from the organic light-emitting diode OLED. In an embodiment, for example, a width of the opening 220OP may correspond to a width of the emission area EMA. In such an embodiment, a width of the opening 220OP may correspond to a width of a sub-pixel.

According to an embodiment, the pixel-defining layer 220 may include an organic insulating material. According to an alternative embodiment, the pixel-defining layer 220 may include an inorganic insulating material, such as $SiN_x$, SiON, or $SiO_2$. According to another alternative embodiment, the pixel-defining layer 220 may include an organic insulating material and an inorganic insulating material. In some embodiments, the pixel-defining layer 220 may include a light-shielding material and may be provided as a black color. The light-shielding material may include a resin or paste including carbon black, a carbon nano-tube, and a black dye, a metal particle, such as Ni, Al, Mo, and an alloy thereof, a metal oxide particle (for example, chromium oxide), a metal nitride particle (for example, chromium nitride), or the like. In an embodiment where the pixel-defining layer 220 includes the light-shielding material, reflection of external light due to metal structures arranged below the pixel-defining layer 220 may be reduced.

The spacer 230 may be arranged on the pixel-defining layer 220. The spacer 230 may be provided to prevent the substrate 100 and/or the multiple layers on the substrate 100 from being damaged in a process of manufacturing a display apparatus. According to an embodiment of a method of manufacturing a display panel, a mask sheet may be used. In such an embodiment, the mask sheet may be introduced into the opening 220OP of the pixel-defining layer 220 or may adhere to the pixel-defining layer 220. In such an embodiment, the spacer 230 may prevent or reduce the damage or fracture defects to the substrate 100 and one or more of the multiple layers due to the mask sheet when a deposition material is deposited on the substrate 100.

The spacer 230 may include an organic material such as polyimide. Alternatively, the spacer 230 may include an inorganic insulating material, such as $SiN_x$ or $SiO_2$, or may include an organic insulating material and an inorganic insulating material. According to an embodiment, the spacer 230 may include a different material from the pixel-defining layer 220. Alternatively, the spacer 230 may include the same material as the pixel-defining layer 220, and in such an embodiment, the pixel-defining layer 220 and the spacer 230 may be formed together with each other by a mask process using a halftone mask, etc.

The intermediate layer 212 may be arranged on the pixel-defining layer 220 and/or the first electrode 211. The intermediate layer 212 may include an emission layer 212b arranged in the opening 220OP of the pixel-defining layer 220. The emission layer 212*b* may include a high molecular-weight or low molecular-weight organic material emitting a predetermined color of light.

The intermediate layer 212 may further include at least one of a first functional layer 212*a* between the first electrode 211 and the emission layer 212*b* and a second functional layer 212*c* between the emission layer 212*b* and the second electrode 213. According to an embodiment, the first functional layer 212*a* and the second functional layer 212*c* may be arranged below and above the emission layer 212*b*, respectively. The first functional layer 212*a* may include, for example, a hole transport layer ("HTL") and/or a hole injection layer ("HIL"). The second functional layer 212*c* may include an electron transport layer ("ETL") and/or an electron injection layer ("EIL"). The first functional layer 212*a* and/or the second functional layer 212*c* may be a common layer formed to entirely cover the substrate 100 like the second electrode 213 to be described below.

The second electrode 213 may be arranged on the intermediate layer 212. According to an embodiment, the second electrode 213 may be an opposite electrode. The second electrode 213 may include a conductive material having a low work function. In an embodiment, for example, the second electrode 213 may include a (semi) transparent layer including Ag, Mg, Al, Pt, Pd, Au, Ni, Nd, Ir, Cr, Li, Ca, or an alloy thereof. Alternatively, the second electrode 213 may further include a layer, such as ITO, IZO, ZnO, or $In_2O_3$, on the (semi) transparent layer including the materials described above.

In some embodiments, a capping layer (not shown) may further be arranged on the second electrode 213. The capping layer may include LiF, an inorganic material, or/and an organic material.

The encapsulation layer 300 may be arranged on the second electrode 213. According to an embodiment, the encapsulation layer 300 may include at least one inorganic encapsulation layer and at least one organic encapsulation layer. According to an embodiment, the encapsulation layer 300 may include a first inorganic encapsulation layer 310, an organic encapsulation layer 320, and a second inorganic encapsulation layer 330 that are sequentially stacked.

The first inorganic encapsulation layer 310 and the second inorganic encapsulation layer 330 may include at least one inorganic material selected from $Al_2O_3$, $TiO_2$, $Ta_2O_5$, $HfO_2$, ZnO, $SiO_2$, $SiN_x$, and SiON. The organic encapsulation layer 320 may include a polymer-based material. The polymer-based material may include acryl-based resins, epoxy-based resins, polyimide, polyethylene, etc. According to an embodiment, the organic encapsulation layer 320 may include acrylate.

Although not shown, a touch sensor layer may be arranged on the encapsulation layer 300, and an optical functional layer may be arranged on the touch sensor layer. The touch sensor layer may obtain coordinate information based on an external input, for example, a touch event.

The optical functional layer may reduce a reflectivity of light (external light) incident toward a display apparatus from the outside and may improve a color purity of light emitted from the display apparatus. According to an embodiment, the optical functional layer may include a phase retarder and/or a polarizer. The phase retarder may include a film-type phase retarder or a liquid crystal coating-type phase retarder, and may include a λ/2 phase retarder and/or a λ/4 phase retarder. The polarizer may also include a film-type polarizer or a liquid crystal coating-type polarizer. The film-type polarizer may include an elongation-type synthetic resin film, and the liquid crystal coating-type polarizer may include liquid crystals arranged in a certain shape of arrangement. The phase retarder and the polarizer may further include a protective film.

According to an alternative embodiment, the optical functional layer may include a black matrix and color filters. The color filters may be arranged by taking into account a color of light emitted from each of pixels of the display panel 10. Each of the color filters may include a red, green, or blue pigment or dye. Alternatively, each of the color filters may further include quantum dots, in addition to the pigment or the dye described above. Alternatively, some of the color filters may not include the pigment or the dye described above and may include scattered particles, such as oxide titanium.

According to an alternative embodiment, the optical functional layer may include a destructive interference structure. The destructive interference structure may include a first reflective layer and a second reflective layer disposed on different layers from each other. Destructive interference may occur to first reflective light and second reflective light reflected from the first reflective layer and the second reflective layer, respectively, and thus, the reflectivity of external light may be decreased.

An adhesion member may be arranged between the touch sensor layer and the optical functional layer. The adhesion member may not be limited to particular types and may be implemented as general members known in the art. The adhesion member may include a pressure sensitive adhesive ("PSA").

Figure 7A:
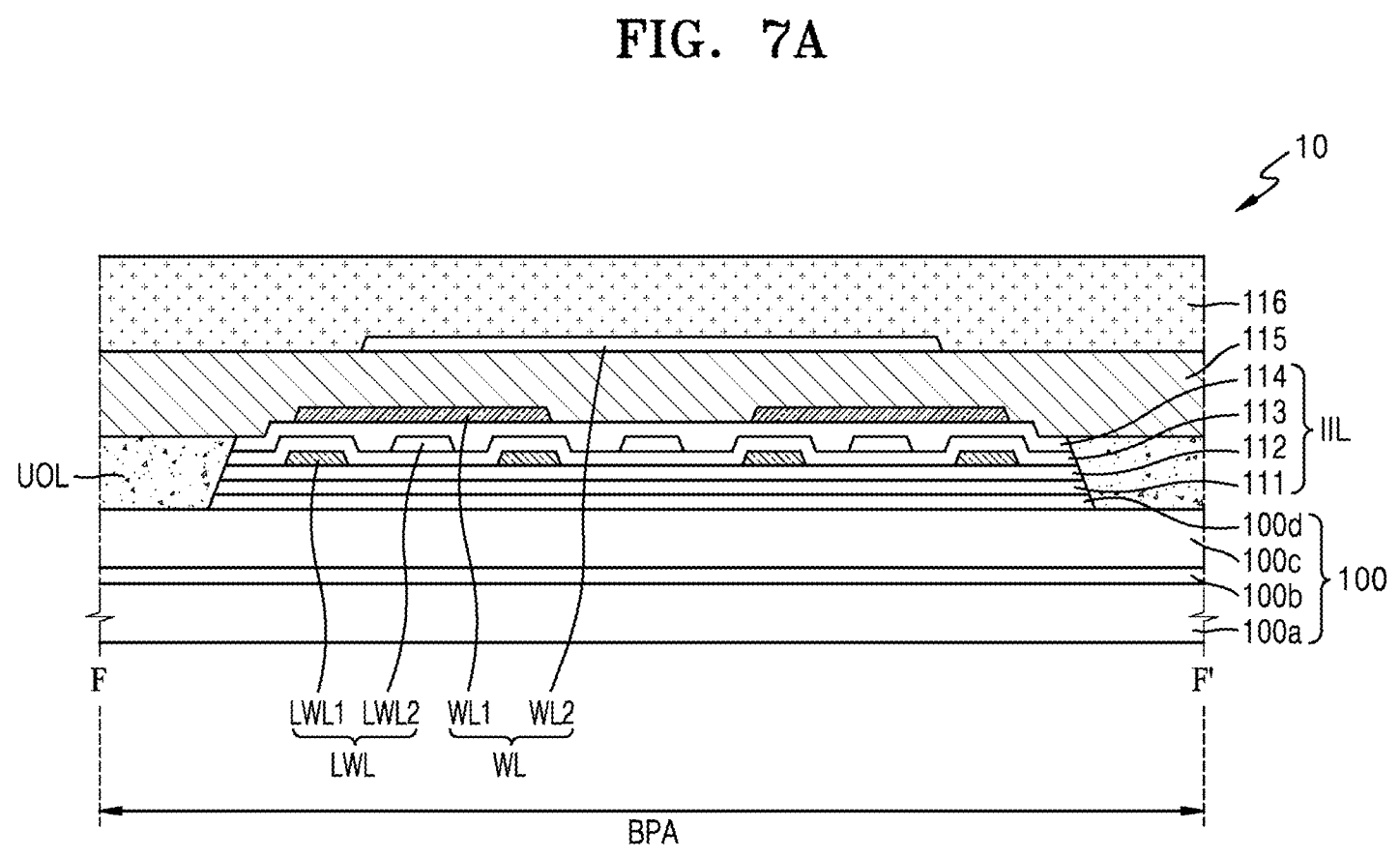
Figure 7B:
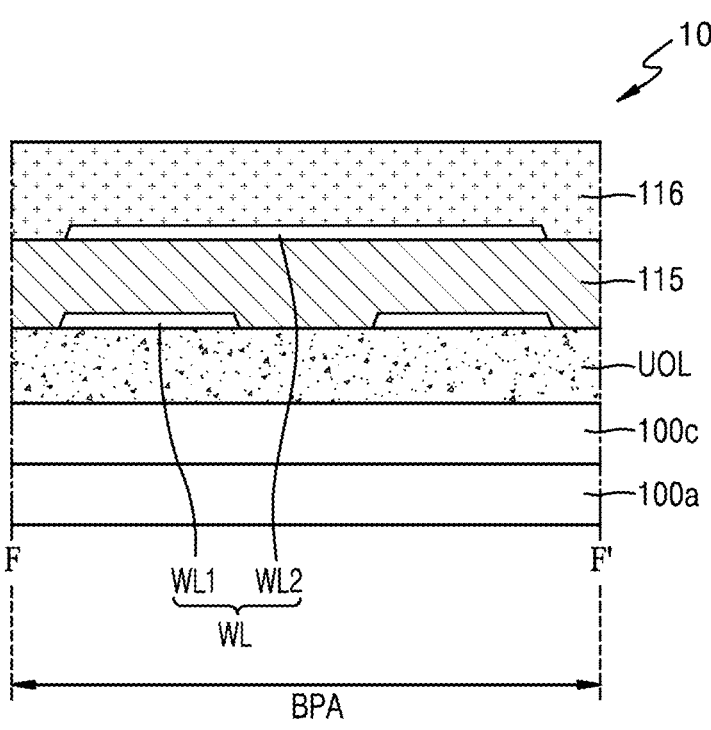

FIGS. 7A and 7B are cross-sectional views of the display panel 10 of FIG. 5A, taken along line F-F', according to various embodiments. In FIGS. 7A and 7B, the same or like reference characters as those in FIG. 6 denote the same or like elements, and any repetitive detailed description thereof will be omitted or simplified.

Referring to FIGS. 7A and 7B, an embodiment of the display panel 10 may include the bypass area BPA. A bypass line WL may be arranged in the bypass area BPA.

Referring to FIG. 7A, in the bypass area BPA, the display panel 10 may include the substrate 100, the inorganic insulating layer IIL, a lower bypass line LWL, a lower organic insulating layer UOL, the intermediate organic insulating layer 115, the bypass line WL, and the organic insulating layer 116.

In the bypass area BPA, the substrate 100 may include the first base layer 100*a*, the first barrier layer 100*b*, the second base layer 100*c*, and the second barrier layer 100*d*.

The inorganic insulating layer IIL may be arranged on the substrate 100 in the bypass area BPA. The inorganic insulating layer IIL may include a buffer layer 111, a first gate insulating layer 112, a second gate insulating layer 113, and an interlayer insulating layer 114.

According to an embodiment, the lower bypass line LWL may be a line configured to transmit a power voltage or a signal. According to an alternative embodiment, the lower bypass line LWL may be a test line configured to test the reliability of the display panel 10. According to another alternative embodiment, the lower bypass line LWL may be a touch sensor line configured to transmit a signal of a touch sensor layer.

The lower bypass line LWL may be inserted into the inorganic insulating layer IIL. According to an embodiment, the lower bypass line LWL may include a first lower bypass line LWL1 and a second lower bypass line LWL2. According to an embodiment, the first lower bypass line LWL1 may be arranged between the first gate insulating layer 112 and the second gate insulating layer 113. According to an embodiment, the second lower bypass line LWL2 may be arranged between the second gate insulating layer 113 and the interlayer insulating layer 114. According to an embodiment, the first lower bypass line LWL1 and the second lower bypass line LWL2 may be alternately arranged with each other. Thus, a width of the bypass area BPA may be reduced, and a stress generated when the bypass area BPA is bent may be reduced.

The first lower bypass line LWL1 may include a conductive material including Mo, Al, Cu, Ti, etc. and may have a single layer structure or a multilayer structure, each layer therein including at least one selected from the conductive materials described above. According to an embodiment, the first lower bypass line LWL1 may be disposed or formed in (or directly on) a same layer as the first gate electrode GE1 (see FIG. 6) by using a same process. The first lower bypass line LWL1 may be disposed or formed in (or directly on) a same layer as the lower electrode CE1 (see FIG. 6) of the storage capacitor Cst (see FIG. 6) by using a same process.

The second lower bypass line LWL2 may include Al, Pt, Pd, Ag, Mg, Au, Ni, Nd, Ir, Cr, Ca, Mo, Ti, W, and/or Cu and may have a single layer structure or a multilayer structure, each layer therein including at least one selected from the materials described above. According to an embodiment, the second lower bypass line LWL2 may be disposed or formed in (or directly on) a same layer as the upper electrode CE2 (see FIG. 6) of the storage capacitor Cst (see FIG. 6) by using a same process.

The lower organic insulating layer UOL may be arranged on the substrate 100 in the bypass area BPA. According to an embodiment, the lower organic insulating layer UOL may cover an edge of the inorganic insulating layer K. The lower organic insulating layer UOL may include an organic material. In an embodiment, for example, the lower organic insulating layer UOL may include an organic insulating material, such as a general-purpose polymer such as PMMA or PS, a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

The bypass line WL may be arranged on the inorganic insulating layer K. According to an embodiment, the bypass line WL may overlap the lower bypass line LWL. Thus, a width of the bypass area BPA may be reduced.

According to an embodiment, the bypass line WL may include a first bypass line WL1 and a second bypass line WL2. The first bypass line WL1 may be arranged on the inorganic insulating layer K. The first bypass line WL1 may include a conductive material including Mo, Al, Cu, Ti, etc. and may have a single layer structure or a multilayer structure, each layer therein including at least one selected from the conductive materials described above. According to an embodiment, the first bypass line WL1 may have a multilayer structure of Ti/Al/Ti. According to an embodiment, the first bypass line WL1 may be disposed or formed in (or directly on) a same layer as the first drain electrode DE1 (see FIG. 6) and the first source electrode SE1 (see FIG. 6) by using the same process.

The intermediate organic insulating layer 115 may be arranged on the first bypass line WL1, the inorganic insulating layer IIL, and the lower organic insulating layer UOL.

The second bypass line WL2 may be arranged on the intermediate organic insulating layer 115. The second bypass line WL2 may include a conductive material including Mo, Al, Cu, Ti, etc. and may have a single layer structure or a multilayer structure, each layer therein including at least one selected from the conductive materials described above. According to an embodiment, the second bypass line WL2 may have a multilayer structure of Ti/Al/Ti. According to an embodiment, the second bypass line WL2 may be disposed or formed in (or directly on) a same layer as the connection electrode CML (see FIG. 6) and the connection line CL (see FIG. 6) by using a same process.

The organic insulating layer 116 may be arranged on the bypass line WL. According to an embodiment, the organic insulating layer 116 may be arranged on the second bypass line WL2.

According to an embodiment, the bypass line WL may be a line configured to transmit a power voltage or a signal. According to an alternative embodiment, the bypass line WL may be a test line configured to test the reliability of the display panel 10. According to another alternative embodiment, the bypass line WL may be a touch sensor line configured to transmit a signal of a touch sensor layer.

Referring to FIG. 7B, in the bypass area BPA, the display panel 10 may include at least one of the first base layer 100a and the second base layer 100c, the lower organic insulating layer UOL, the bypass line WL, the intermediate organic insulating layer 115, and the organic insulating layer 116.

At least one of the first base layer 100a and the second base layer 100c may be arranged in the bypass area BPA. FIG. 7B illustrates an embodiment where the first base layer 100a and the second base layer 100c are sequentially stacked on the bypass area BPA.

The lower organic insulating layer UOL may be arranged on at least one of the first base layer 100a and the second base layer 100c. According to an embodiment, the lower organic insulating layer UOL may be arranged on the second base layer 100c.

The bypass line WL may be arranged on the lower organic insulating layer UOL. According to an embodiment, the bypass line WL may include the first bypass line WL1 and the second bypass line WL2. According to an embodiment, the first bypass line WL1 may be arranged on the lower organic insulating layer UOL.

The intermediate organic insulating layer 115 may be arranged on the lower organic insulating layer UOL and the first bypass line WL1.

The organic insulating layer 116 may be arranged on the bypass line WL. According to an embodiment, the organic insulating layer 116 may be arranged on the second bypass line WL2. The second bypass line WL2 may be arranged on the intermediate organic insulating layer 115.

According to an embodiment, the first bypass line WL1 may overlap the second bypass line WL2. Thus, a width of the bypass area BPA may be reduced.

In an embodiment, as shown in FIG. 7B, the bypass area BPA may not include the first barrier layer 100b, the second barrier layer 100d, the lower bypass line LWL, and the inorganic insulating layer IIL, unlike the bypass area BPA described with reference to FIG. 7A. Thus, a contraction rate of the bypass area BPA described with reference to FIG. 7B may be greater than a contraction rate of the bypass area BPA described with reference to FIG. 7A. The bypass area BPA described with reference to FIG. 7B may be applied to an area for which high contraction is expected. The bypass area BPA described with reference to FIG. 7A may be applied to an area for which low contraction is expected.

The bypass area BPA described with reference to FIG. 7A may further include the lower bypass line LWL, unlike the bypass area BPA described with reference to FIG. 7B. Thus, the bypass area BPA described with reference to FIG. 7A may have various arrangement structures.

Figure 8:
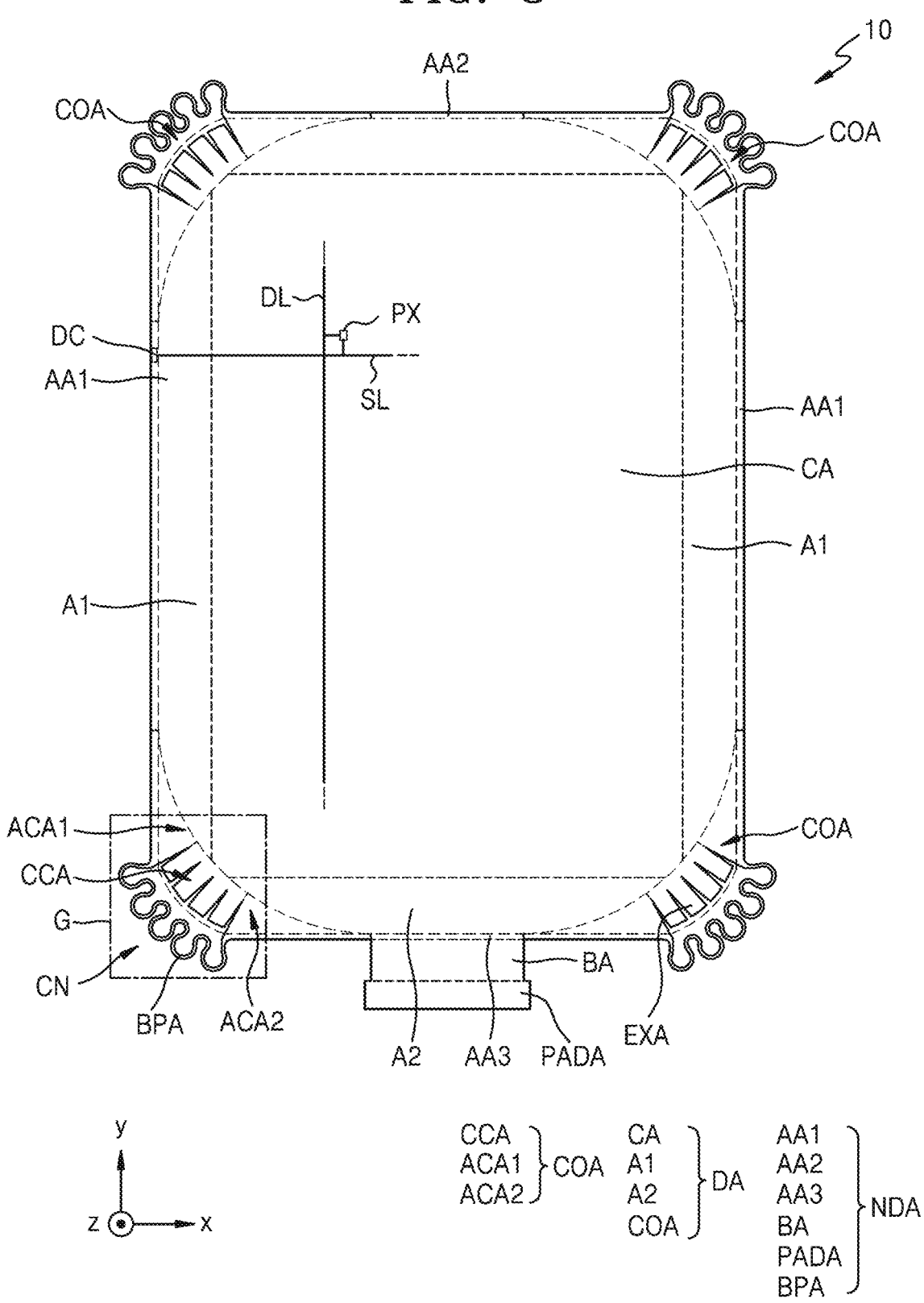
FIG. 8 is a schematic plan view of a display panel according to another embodiment.
Figure 9:
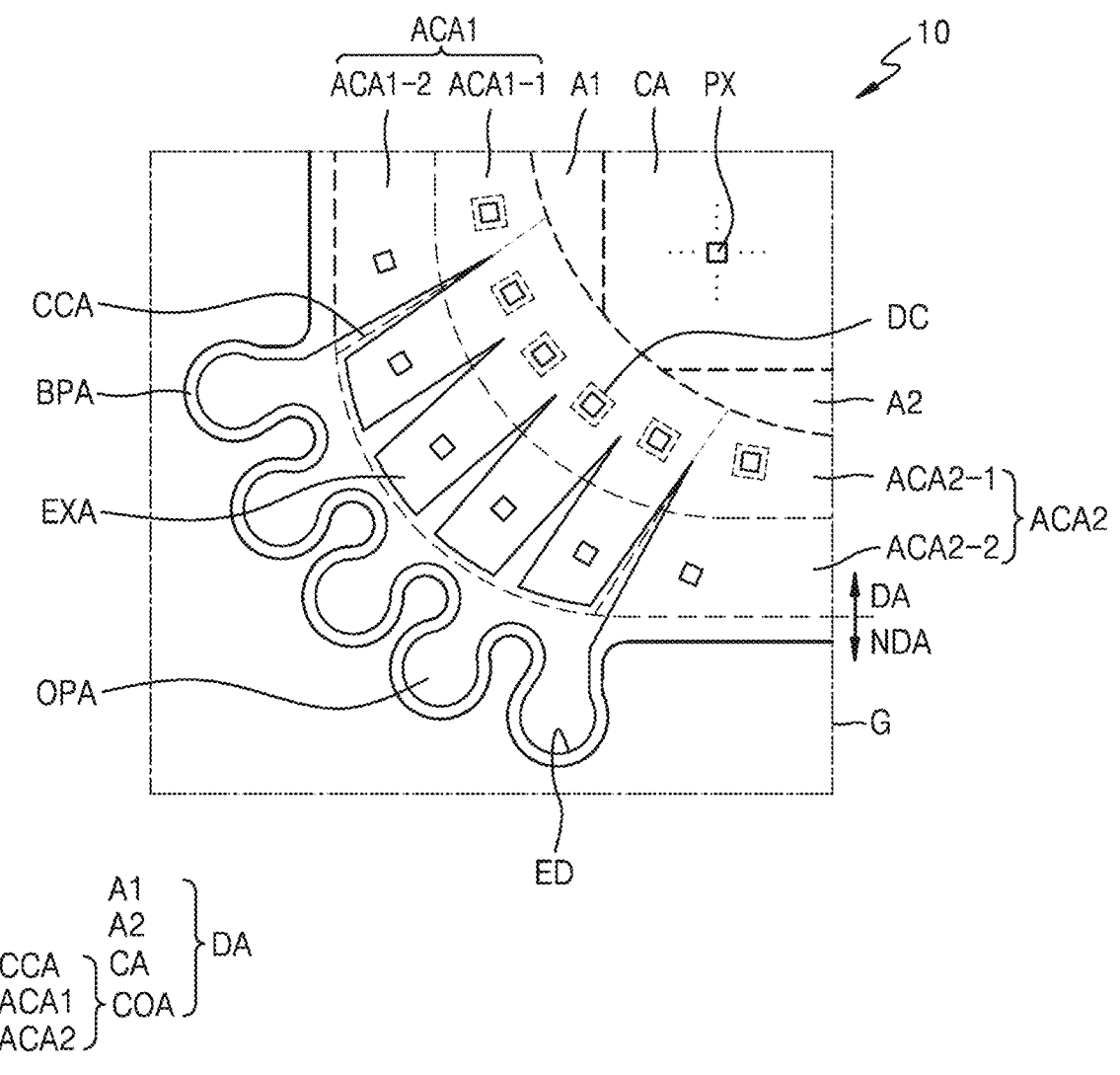
FIG. 9 is an enlarged view of a region G of the display panel of FIG. 8.

FIG. 8 is a schematic plan view of the display panel 10 according to another embodiment. FIG. 9 is an enlarged view of a region G of the display panel 10 of FIG. 8. FIG. 8 is a schematic plan view of the display panel 10 in an unbent state. In FIGS. 8 and 9, the same or like reference characters as those in FIGS. 3 and 5A denote the same or like elements, and any repetitive detailed description thereof will be omitted or simplified.

Referring to FIGS. 8 and 9, an embodiment of the display panel 10 may display an image. The display panel 10 may include the display area DA and the non-display area NDA. The pixel PX may be arranged in the display area DA. According to an embodiment, the plurality of pixels PX may be arranged in the display area DA. The pixel PX may not be arranged in the non-display area NDA. The display area DA may include the center area CA, the first adjacent area A1, the second adjacent area A2, and the corner area COA.

The corner area COA may be an area arranged at the corner CN of the display panel 10. According to an embodiment, the corner area COA may be arranged outside the center area CA. According to an embodiment, the corner area COA may at least partially surround the center area CA, the first adjacent area A1, and the second adjacent area A2. The corner area COA may include the central corner area CCA, the first adjacent corner area ACA1, and the second adjacent corner area ACA2.

The central corner area CCA may include the plurality of extension areas EXA each extending in a direction away from the center area CA. According to an embodiment, the plurality of extension areas EXA may extend in a direction crossing the first direction (for example, the x direction or the −x direction) and/or the second direction (for example, the y direction or the −y direction). The plurality of extension areas EXA may be at least partially separated from each other. Thus, each of the plurality of extension areas EXA may have an edge. A component of the display panel 10 may not be arranged between the adjacent extension areas EXA. In such an embodiment, an empty space may be defined between the adjacent extension areas EXA.

The first adjacent corner area ACA1 may be adjacent to the central corner area CCA. According to an embodiment, the first adjacent corner area ACA1 may be arranged between the central corner area CCA and the first adjacent area A1. According to an embodiment, at least a portion of the first adjacent area A1 may be arranged between the center area CA and the first adjacent corner area ACA1 in the first direction (for example, the x direction or the −x direction). According to an embodiment, at least a portion of the first adjacent area A1 and the first adjacent corner area ACA1 may be arranged in the first direction (for example, the x direction or the −x direction). According to an embodiment, the first adjacent corner area ACA1 may include the first inner corner area ACA1-1 and the first outer corner area ACA1-2. The first inner corner area ACA1-1 may be arranged between the first outer corner area ACA1-2 and the first adjacent area A1. The pixel PX may be arranged in each of the first inner corner area ACA1-1 and the first outer corner area ACA1-2.

The second adjacent corner area ACA2 may be adjacent to the central corner area CCA. According to an embodiment, the second adjacent corner area ACA2 may be spaced apart from the first adjacent corner area ACA1 with the central corner area CCA therebetween. The central corner area CCA may be arranged between the first adjacent corner area ACA1 and the second adjacent corner area ACA2. According to an embodiment, at least a portion of the second adjacent area A2 may be arranged between the center area CA and the second adjacent corner area ACA2 in the second direction (for example, the y direction or the −y direction). According to an embodiment, at least a portion of the second adjacent area A2 and the second adjacent corner area ACA2 may be arranged in the second direction (for example, the y direction or the −y direction). The second adjacent corner area ACA2 may include the second inner corner area ACA2-1 and the second outer corner area ACA2-2. The second inner corner area ACA2-1 may be arranged between the second outer corner area ACA2-2 and the second adjacent area A2. The pixel PX may be arranged in each of the second inner corner area ACA2-1 and the second outer corner area ACA2-2.

The non-display area NDA may not display an image. The non-display area NDA may be arranged outside the display area DA. The non-display area NDA may at least partially surround the display area DA. According to an embodiment, the non-display area NDA may entirely surround the display area DA. The non-display area NDA may include the first peripheral area AA1, the second peripheral area AA2, the third peripheral area AA3, the bending area BA, the pad area PADA, and the bypass area BPA.

The bypass area BPA may at least partially surround the corner area COA. According to an embodiment, the bypass area BPA may at least partially surround the central corner area CCA. According to an embodiment, the bypass area BPA may be provided in a multiple number, and the plurality of bypass areas BPA may at least partially surround the plurality of corner areas COA, respectively. The bypass area BPA may extend from the first adjacent corner area ACA1 to the second adjacent corner area ACA2.

At least a portion of the bypass area BPA may have a round shape. According to an embodiment, at least a portion of an edge of the bypass area BPA may extend to have a round shape. According to an embodiment, the bypass area BPA may extend in a serpentine shape. Thus, in a state where the corner area COA bends, the damage to the bypass area BPA may be effectively prevented or substantially reduced.

A bypass line may be arranged in the bypass area BPA. According to an embodiment, the bypass line may be a line configured to transmit a power voltage or a signal to the pixel PX. According to an alternative embodiment, the bypass line may be a test line configured to test the reliability of the display panel 10. According to another alternative embodiment, the bypass line may be a touch sensor line configured to transmit a signal of a touch sensor layer included in the display panel 10.

An opening area OPA may be defined as an area surrounded by the first adjacent corner area ACA1, the plurality of extension areas EXA, the second adjacent corner area ACA2, and the bypass area BPA. A component of the display panel 10 may not be arranged in the opening area OPA. The opening area OPA may have an edge ED. The edge ED of the opening area OPA may include a portion of an edge of the first adjacent corner area ACA1, edges of the plurality of extension areas EXA, a portion of an edge of the second adjacent corner area ACA2, and a portion of an edge of the bypass area BPA. The portion of the edge of the first adjacent corner area ACA1 may be connected to the edge of any one of the plurality of extension areas EXA adjacent to the first adjacent corner area ACA1. The edges of the adjacent extension areas EXA may be connected to each other. The edge of any one of the plurality of extension areas EXA adjacent to the second adjacent corner area ACA2 may be connected to the edge of the second adjacent corner area ACA2. The portion of the edge of the second adjacent corner area ACA2 may be connected to the portion of the edge of the bypass area BPA. The portion of the edge of the bypass area BPA may be connected to the portion of the edge of the first adjacent corner area ACA1.

According to an embodiment, the bypass line is arranged in the bypass area BPA, such that an area of the corner area COA, the area of the corner area COA being occupied by the line and/or the driving circuit DC, may be reduced. Thus, when the central corner area CCA bends, a size of the stress generated in the central corner area CCA may be reduced, and the reliability of the display panel 10 may be increased. In such an embodiment, the bypass line may transmit a power voltage or a signal to the pixel PX, and thus, the resistance of a line configured to transmit a power voltage and/or a signal to the pixel PX may be reduced.

In embodiments of the invention, as described above, the corner area may include: the central corner area including the plurality of extension areas, each extending in a direction away from the center area, the first adjacent corner area adjacent to the central corner area, and the second adjacent corner area spaced apart from the first adjacent corner area with the central corner area therebetween. In such embodiments, the non-display area may include the bypass area extending from the first adjacent corner area to the second adjacent corner area to at least partially surround the central corner area. Thus, the amount of stress generated in the corner area may be reduced, and the display panel and the display apparatus may have the increased reliability.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel comprising:
a display area which includes a center area and a corner area arranged at a corner of the display panel, wherein a plurality of pixels is arranged in the corner area; and
a non-display area arranged outside the display area,
wherein the corner area includes: a central corner area including a plurality of extension areas, each extending in a direction away from the center area and at least partially separated from each other; a first adjacent corner area adjacent to the central corner area; and a second adjacent corner area spaced apart from the first adjacent corner area with the central corner area therebetween, and
the non-display area includes a bypass area extending from the first adjacent corner area to the second adjacent corner area to at least partially surround the central corner area, wherein the bypass area extends from each of the plurality of extension areas in the direction away from the center area.

2. The display panel of claim 1, wherein
the plurality of extension areas and the bypass area are integrally formed with each other as a single unitary unit.

3. The display panel of claim 2, wherein
a first opening area is defined by being surrounded by the first adjacent corner area, a corresponding one of the plurality of extension areas adjacent to the first adjacent corner area, and the bypass area, wherein the first opening area has a first edge having a shape of a closed curve, and
a second opening area is defined by being surrounded by the second adjacent corner area, a corresponding one of the plurality of extension areas adjacent to the second adjacent corner area, and the bypass area, wherein the second opening area has a second edge having a shape of a closed curve.

4. The display panel of claim 2, wherein
the plurality of extension areas include a first extension area and a second extension area adjacent to each other,
a third opening area is defined by being surrounded by the first extension area, the second extension area, and the bypass area, and
the third opening area has a third edge having a shape of a closed curve.

5. The display panel of claim 4, further comprising:
a plurality of driving circuits including a first driving circuit arranged in the first extension area and a second driving circuit arranged in the second extension area,
wherein the plurality of pixels include a first pixel arranged in the first extension area and overlapping the first driving circuit and a second pixel arranged in the second extension area and overlapping the second driving circuit, and
the third opening area extends between the first driving circuit and the second driving circuit.

6. The display panel of claim 1, wherein
an opening area is defined by being surrounded by the first adjacent corner area, the plurality of extension areas, the second adjacent corner area, and the bypass area, and
the opening area has an edge having a shape of a closed curve.

7. The display panel of claim 1, wherein at least a portion of the bypass area has a round shape.

8. The display panel of claim 1, further comprising:
an inorganic insulating layer arranged in the bypass area;
a bypass line arranged on the inorganic insulating layer; and
an organic insulating layer arranged on the bypass line.

9. The display panel of claim 1, further comprising:
a lower organic insulating layer arranged in the bypass area;
a bypass line arranged on the lower organic insulating layer; and
an organic insulating layer arranged on the bypass line.

10. The display panel of claim 1, wherein
the display area further includes a first adjacent area extending from the center area in a first direction and a second adjacent area extending from the center area in a second direction crossing the first direction, and
the corner area at least partially surrounds the first adjacent area, the center area, and the second adjacent area.

* * * * *